United States Patent
Sanghi et al.

(10) Patent No.: US 10,845,868 B2
(45) Date of Patent: Nov. 24, 2020

(54) METHODS AND APPARATUS FOR RUNNING AND BOOTING AN INTER-PROCESSOR COMMUNICATION LINK BETWEEN INDEPENDENTLY OPERABLE PROCESSORS

(71) Applicant: Apple Inc., Cupertino, CA (US)

(72) Inventors: Karan Sanghi, San Jose, CA (US); Saurabh Garg, San Jose, CA (US); Haining Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/780,734

(22) Filed: Feb. 3, 2020

(65) Prior Publication Data
US 2020/0249744 A1    Aug. 6, 2020

Related U.S. Application Data

(60) Continuation of application No. 16/133,543, filed on Sep. 17, 2018, now Pat. No. 10,551,906, which is a
(Continued)

(51) Int. Cl.
*G06F 13/10*    (2006.01)
*G06F 1/3293*    (2019.01)
(Continued)

(52) U.S. Cl.
CPC .......... *G06F 1/3293* (2013.01); *G06F 1/3228* (2013.01); *G06F 1/3243* (2013.01);
(Continued)

(58) Field of Classification Search
None
See application file for complete search history.

(56) References Cited

U.S. PATENT DOCUMENTS

| 4,805,137 A | 2/1989 | Grant et al. |
| 4,949,299 A | 8/1990 | Pickett |

(Continued)

FOREIGN PATENT DOCUMENTS

| EP | 3013008 A1 | 4/2016 |
| JP | 2004086792 A | 3/2004 |

(Continued)

OTHER PUBLICATIONS

ECN L1 PM Substates with CLKREQ approved Aug. 23, 2012.
(Continued)

*Primary Examiner* — Cheng Yuan Tseng
(74) *Attorney, Agent, or Firm* — Gazdzinski & Associates, PC

(57) ABSTRACT

Methods and apparatus for an inter-processor communication (IPC) link between two (or more) independently operable processors. In one aspect, the IPC protocol is based on a "shared" memory interface for run-time processing (i.e., the independently operable processors each share (either virtually or physically) a common memory interface). In another aspect, the IPC communication link is configured to support a host driven boot protocol used during a boot sequence to establish a basic communication path between the peripheral and the host processors. Various other embodiments described herein include sleep procedures (as defined separately for the host and peripheral processors), and error handling.

21 Claims, 25 Drawing Sheets

Related U.S. Application Data division of application No. 14/879,024, filed on Oct. 8, 2015, now Pat. No. 10,078,361.

(60) Provisional application No. 62/061,605, filed on Oct. 8, 2014.

(51) Int. Cl.

| | | |
|---|---|---|
| *G06F 1/3287* | (2019.01) | |
| *G06F 13/42* | (2006.01) | |
| *G06F 9/4401* | (2018.01) | |
| *G06F 1/3228* | (2019.01) | |
| *G06F 1/3234* | (2019.01) | |
| *G06F 11/14* | (2006.01) | |

(52) U.S. Cl.
CPC .......... *G06F 1/3287* (2013.01); *G06F 9/4403* (2013.01); *G06F 9/4405* (2013.01); *G06F 9/4411* (2013.01); *G06F 11/1471* (2013.01); *G06F 13/4282* (2013.01); *G06F 11/1417* (2013.01); *G06F 11/1474* (2013.01); *G06F 2201/805* (2013.01); *G06F 2201/87* (2013.01); *Y02D 10/00* (2018.01)

(56) References Cited

U.S. PATENT DOCUMENTS

| | | |
|---|---|---|
| 4,987,529 A | 1/1991 | Craft et al. |
| 5,339,427 A | 8/1994 | Elko et al. |
| 5,367,688 A | 11/1994 | Croll |
| 5,467,459 A | 11/1995 | Alexander et al. |
| 5,485,578 A | 1/1996 | Sweazey |
| 5,613,086 A | 3/1997 | Frey et al. |
| 5,659,542 A | 8/1997 | Bell et al. |
| 5,692,182 A | 11/1997 | Desai |
| 5,708,779 A | 1/1998 | Graziano et al. |
| 5,731,973 A | 3/1998 | Takaishi et al. |
| 5,850,395 A | 12/1998 | Hauser et al. |
| 5,903,564 A | 5/1999 | Ganmukhi et al. |
| 5,943,507 A | 8/1999 | Cornish et al. |
| 6,032,179 A | 2/2000 | Osborne |
| 6,212,566 B1 | 4/2001 | Vanhoof et al. |
| 6,216,178 B1 | 4/2001 | Stracovsky et al. |
| 6,233,702 B1 | 5/2001 | Bunton et al. |
| 6,260,152 B1 | 7/2001 | Cole et al. |
| 6,359,863 B1 | 3/2002 | Varma et al. |
| 6,411,997 B1 | 6/2002 | Dawes et al. |
| 6,434,633 B1 | 8/2002 | Braun et al. |
| 6,466,898 B1 | 10/2002 | Chan |
| 6,523,073 B1 | 2/2003 | Kammer et al. |
| 6,553,446 B1 | 4/2003 | Miller |
| 6,693,895 B1 | 2/2004 | Crummey et al. |
| 6,735,642 B2 | 5/2004 | Kagan et al. |
| 6,947,442 B1 | 9/2005 | Sato et al. |
| 6,948,094 B2 | 9/2005 | Schultz et al. |
| 6,990,594 B2 | 1/2006 | Kim et al. |
| 7,099,949 B1 | 8/2006 | Vanhoof et al. |
| 7,100,020 B1 | 8/2006 | Brightman et al. |
| 7,127,600 B2 | 10/2006 | Zimmer et al. |
| 7,159,221 B1 | 1/2007 | Willen et al. |
| 7,191,240 B1 | 3/2007 | Johnson |
| 7,281,172 B2 | 10/2007 | Chujo |
| 7,397,774 B1 | 7/2008 | Holland et al. |
| 7,398,382 B2 | 7/2008 | Rothman et al. |
| 7,403,542 B1 | 7/2008 | Thompson |
| 7,506,084 B2 | 3/2009 | Moerti et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,681,012 B2 | 3/2010 | Verm et al. |
| 7,685,476 B2 | 3/2010 | Andre et al. |
| 7,802,256 B2 | 9/2010 | Havens et al. |
| 7,813,366 B2 | 10/2010 | Freimuth et al. |
| 7,853,731 B1 | 12/2010 | Zeng |
| 7,864,720 B2 | 1/2011 | Jeyaseelan |
| 7,899,941 B2 | 3/2011 | Hendry et al. |
| 7,908,335 B1 | 3/2011 | Citterelle et al. |
| 7,941,682 B2 | 5/2011 | Adams |
| 7,957,777 B1 | 6/2011 | Vu et al. |
| 8,214,707 B2 | 7/2012 | Munson et al. |
| 8,230,248 B2 | 7/2012 | Dance et al. |
| 8,255,725 B2 | 8/2012 | Shimazaki et al. |
| 8,310,965 B1 | 11/2012 | Zhang et al. |
| 8,352,624 B2 | 1/2013 | Zimmerman et al. |
| 8,359,449 B2 | 1/2013 | Accapadi et al. |
| 8,422,404 B2 | 4/2013 | Taki |
| 8,468,285 B2 | 6/2013 | Kobayashi |
| 8,555,099 B2 | 10/2013 | Marinkovic et al. |
| 8,600,820 B2 | 12/2013 | Hoffman |
| 8,635,412 B1 | 1/2014 | Wilshire |
| 8,656,228 B2 | 2/2014 | Check et al. |
| 8,756,601 B2 | 6/2014 | Plondke et al. |
| 8,769,168 B2 | 7/2014 | Moertl et al. |
| 8,788,822 B1 | 7/2014 | Riddle |
| 8,799,537 B1 | 8/2014 | Zhu et al. |
| 8,808,091 B2 | 8/2014 | Shaw et al. |
| 8,819,386 B1 | 8/2014 | Mather |
| 8,832,331 B2 | 9/2014 | Co |
| 8,848,809 B2 | 9/2014 | Whitby-Strevens |
| 8,862,923 B1 | 10/2014 | Leung et al. |
| 8,914,649 B2 | 12/2014 | So et al. |
| 9,021,275 B1 | 4/2015 | Greenan et al. |
| 9,049,179 B2 | 6/2015 | Luna |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,356,844 B2 | 5/2016 | Kim et al. |
| 9,439,142 B2 | 9/2016 | Zhu et al. |
| 9,544,069 B2 | 1/2017 | Whitby-Strevens et al. |
| 9,547,535 B1 | 1/2017 | Wilt |
| 9,568,970 B1 | 2/2017 | Kaushal et al. |
| 9,582,448 B2 | 2/2017 | Saitou |
| 9,594,718 B2 * | 3/2017 | Kaushik .............. G06F 13/4269 |
| 9,628,211 B1 | 4/2017 | Stoler et al. |
| 9,762,482 B2 | 9/2017 | Sukumar et al. |
| 9,769,756 B1 | 9/2017 | Cui et al. |
| 9,798,377 B2 | 10/2017 | Sanghi et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,946,325 B2 | 4/2018 | Leucht-Roth et al. |
| 9,959,124 B1 | 5/2018 | Herbeck et al. |
| 9,971,397 B2 | 5/2018 | Sanghi et al. |
| 9,985,904 B2 | 5/2018 | Shalev et al. |
| 10,078,361 B2 | 9/2018 | Sanghi et al. |
| 10,146,696 B1 | 12/2018 | Krigovski |
| 10,230,608 B2 | 3/2019 | Tsirkin |
| 1,028,955 A1 | 5/2019 | Michaud et al. |
| 10,331,600 B1 | 6/2019 | Rajadnya et al. |
| 10,331,612 B1 | 6/2019 | Petkov et al. |
| 10,534,601 B1 | 1/2020 | Venkata et al. |
| 2002/0013821 A1 | 1/2002 | Kasper |
| 2002/0013868 A1 | 1/2002 | West |
| 2002/0044553 A1 | 4/2002 | Chakravorty |
| 2002/0053011 A1 | 5/2002 | Aiken et al. |
| 2002/0065867 A1 | 5/2002 | Chauvel |
| 2002/0169938 A1 | 11/2002 | Scott et al. |
| 2003/0014607 A1 | 1/2003 | Slavin et al. |
| 2003/0086122 A1 | 5/2003 | Parry |
| 2003/0099221 A1 | 5/2003 | Rhee |
| 2003/0112758 A1 | 6/2003 | Pang et al. |
| 2003/0200413 A1 | 10/2003 | Gurumoorthy et al. |
| 2004/0010473 A1 | 1/2004 | Hsu et al. |
| 2004/0044929 A1 | 3/2004 | Chujo |
| 2004/0064589 A1 | 4/2004 | Boucher et al. |
| 2004/0128568 A1 | 7/2004 | O'Shea |
| 2004/0179546 A1 | 9/2004 | McDaniel et al. |
| 2004/0201749 A1 | 10/2004 | Malloy |
| 2004/0221056 A1 | 11/2004 | Kobayashi |
| 2004/0228365 A1 | 11/2004 | Kobayashi |
| 2004/0268172 A1 | 12/2004 | Kates et al. |

(56) References Cited

U.S. PATENT DOCUMENTS

| | | |
|---|---|---|
| 2005/0033947 A1 | 2/2005 | Morris et al. |
| 2005/0047356 A1 | 3/2005 | Fujii et al. |
| 2005/0076122 A1 | 4/2005 | Khawand et al. |
| 2005/0076196 A1 | 4/2005 | Zimmer et al. |
| 2005/0076244 A1 | 4/2005 | Watanabe |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0138628 A1 | 6/2005 | Bradford et al. |
| 2005/0149711 A1 | 7/2005 | Zimmer et al. |
| 2005/0157781 A1 | 7/2005 | Ho et al. |
| 2005/0278498 A1 | 12/2005 | Ahluwalia et al. |
| 2005/0285862 A1 | 12/2005 | Noda et al. |
| 2006/0039285 A1 | 2/2006 | Chapman et al. |
| 2006/0047989 A1 | 3/2006 | Delgado et al. |
| 2006/0075269 A1 | 4/2006 | Liong et al. |
| 2006/0107071 A1 | 5/2006 | Girish et al. |
| 2006/0218301 A1 | 9/2006 | O'Toole et al. |
| 2006/0259799 A1 | 11/2006 | Melpignano et al. |
| 2007/0005869 A1 | 1/2007 | Balraj et al. |
| 2007/0043901 A1 | 2/2007 | Wu et al. |
| 2007/0070997 A1 | 3/2007 | Weitz et al. |
| 2007/0083687 A1 | 4/2007 | Rinaldi |
| 2007/0180041 A1 | 8/2007 | Suzuoki |
| 2007/0183418 A1 | 8/2007 | Riddoch et al. |
| 2007/0201492 A1 | 8/2007 | Kobayashi |
| 2007/0226375 A1 | 9/2007 | Chu et al. |
| 2007/0226417 A1 | 9/2007 | Davis |
| 2007/0286246 A1 | 12/2007 | Kobayashi et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0127292 A1 | 5/2008 | Cooper et al. |
| 2008/0183931 A1 | 7/2008 | Verm et al. |
| 2008/0218225 A1 | 9/2008 | Shibayama et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0024924 A1 | 1/2009 | Kim |
| 2009/0083560 A1 | 3/2009 | O'Connell et al. |
| 2009/0109230 A1 | 4/2009 | Miller et al. |
| 2009/0113141 A1 | 4/2009 | Bullman et al. |
| 2009/0133016 A1 | 5/2009 | Brown et al. |
| 2009/0138650 A1 | 5/2009 | Lin et al. |
| 2009/0172674 A1 | 7/2009 | Bobak et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0240874 A1 | 9/2009 | Pong |
| 2009/0265723 A1 | 10/2009 | Mochizuki et al. |
| 2009/0282050 A1 | 11/2009 | Thomas et al. |
| 2009/0282088 A1 | 11/2009 | Thomas et al. |
| 2009/0310618 A1 | 12/2009 | Carter |
| 2009/0327074 A1 | 12/2009 | Callaway, Jr. et al. |
| 2010/0005014 A1 | 1/2010 | Castle et al. |
| 2010/0017655 A1 | 1/2010 | Gooding et al. |
| 2010/0027729 A1 | 2/2010 | Murphy et al. |
| 2010/0030932 A1 | 2/2010 | Ergas et al. |
| 2010/0082859 A1 | 4/2010 | Hendry et al. |
| 2010/0097931 A1 | 4/2010 | Mustafa |
| 2010/0098419 A1 | 4/2010 | Levy et al. |
| 2010/0161959 A1 | 6/2010 | Sood |
| 2010/0329319 A1 | 12/2010 | Dai et al. |
| 2011/0022859 A1 | 1/2011 | More et al. |
| 2011/0029696 A1 | 2/2011 | Uehara |
| 2011/0035575 A1 | 2/2011 | Kwon et al. |
| 2011/0052142 A1 | 3/2011 | Sultenfuss et al. |
| 2011/0083002 A1 | 4/2011 | Albers et al. |
| 2011/0161619 A1 | 6/2011 | Kaminski et al. |
| 2011/0219208 A1 | 9/2011 | Asaad et al. |
| 2011/0242425 A1 | 10/2011 | Zeng |
| 2011/0246742 A1 | 10/2011 | Kogen et al. |
| 2011/0248865 A1 | 10/2011 | Hong et al. |
| 2011/0257983 A1 | 10/2011 | Rathonyi et al. |
| 2011/0276695 A1 | 11/2011 | Maldaner |
| 2011/0276710 A1 | 11/2011 | Mighani et al. |
| 2011/0283031 A1 | 11/2011 | Lee |
| 2011/0292936 A1 | 12/2011 | Wang et al. |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0036334 A1 | 2/2012 | Horman et al. |
| 2012/0066523 A1 | 3/2012 | Kobayashi |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0120959 A1 | 5/2012 | Krause |
| 2012/0124252 A1 | 5/2012 | Kayama et al. |
| 2012/0159513 A1 | 6/2012 | Pakhunov et al. |
| 2012/0203880 A1 | 8/2012 | Kluyt et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0067188 A1 | 3/2013 | Mehra et al. |
| 2013/0124895 A1 | 5/2013 | Saha et al. |
| 2013/0138840 A1 | 5/2013 | Kegel et al. |
| 2013/0162911 A1 | 6/2013 | Glen |
| 2013/0166943 A1 | 6/2013 | Song et al. |
| 2013/0173950 A1 | 7/2013 | Banerjea et al. |
| 2013/0188544 A1 | 7/2013 | Tiwari et al. |
| 2013/0204927 A1 | 8/2013 | Kruglikov et al. |
| 2013/0205113 A1 | 8/2013 | Ahmad et al. |
| 2013/0275976 A1 | 10/2013 | Dawson et al. |
| 2013/0290947 A1 | 10/2013 | Li |
| 2014/0033220 A1 | 1/2014 | Campbell et al. |
| 2014/0052976 A1 | 2/2014 | Marino et al. |
| 2014/0068624 A1 | 3/2014 | Fuller et al. |
| 2014/0068636 A1 | 3/2014 | Dupont et al. |
| 2014/0082242 A1 | 3/2014 | Murphy et al. |
| 2014/0101468 A1 | 4/2014 | Narayanan et al. |
| 2014/0122695 A1 | 5/2014 | Kulikov et al. |
| 2014/0122828 A1 | 5/2014 | Kagan et al. |
| 2014/0129784 A1 | 5/2014 | Chapman et al. |
| 2014/0173236 A1 | 6/2014 | Kegel |
| 2014/0189057 A1 | 7/2014 | Sankoda et al. |
| 2014/0189392 A1 | 7/2014 | Bodio et al. |
| 2014/0211894 A1 | 7/2014 | Yang et al. |
| 2014/0215236 A1 | 7/2014 | Heinrich et al. |
| 2014/0244866 A1 | 8/2014 | Manula et al. |
| 2014/0247983 A1 | 9/2014 | MacInnis et al. |
| 2014/0372656 A1 | 12/2014 | Sakurai et al. |
| 2015/0007262 A1 | 1/2015 | Aissi et al. |
| 2015/0036051 A1 | 2/2015 | Broberg et al. |
| 2015/0149797 A1 | 5/2015 | Kanigicherla et al. |
| 2015/0156122 A1 | 6/2015 | Singh et al. |
| 2015/0172345 A1 | 6/2015 | Mantin et al. |
| 2015/0189109 A1 | 7/2015 | Whitby-Strevens |
| 2015/0205749 A1 | 7/2015 | Whitby-Strevens et al. |
| 2015/0212806 A1 | 7/2015 | Hsieh |
| 2015/0244804 A1 | 8/2015 | Warfield et al. |
| 2015/0271265 A1 | 9/2015 | Kobayashi et al. |
| 2015/0293873 A1 | 10/2015 | Shao et al. |
| 2015/0293875 A1 | 10/2015 | Sala et al. |
| 2015/0309650 A1 | 10/2015 | Ahmed et al. |
| 2015/0309940 A1 | 10/2015 | Kumar et al. |
| 2015/0326542 A1 | 11/2015 | Serebrin |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0044143 A1 | 2/2016 | Narasimhamurthy |
| 2016/0070323 A1 | 3/2016 | Patil et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0179157 A1 | 6/2016 | Ardanaz et al. |
| 2016/0191400 A1 | 6/2016 | Sreeramoju |
| 2016/0224097 A1 | 8/2016 | Hirouchi |

(56) References Cited

U.S. PATENT DOCUMENTS

| | | |
|---|---|---|
| 2016/0224442 A1 | 8/2016 | Sanghi et al. |
| 2016/0226957 A1 | 8/2016 | Zhang et al. |
| 2016/0231929 A1 | 8/2016 | Tsirkin |
| 2016/0261632 A1 | 9/2016 | Kolhi et al. |
| 2016/0266633 A1 | 9/2016 | Rabii et al. |
| 2016/0269991 A1 | 9/2016 | Van Greunen et al. |
| 2016/0299860 A1 | 10/2016 | Harriman |
| 2016/0357443 A1 | 12/2016 | Li et al. |
| 2016/0363955 A1 | 12/2016 | Stevens et al. |
| 2016/0364350 A1 | 12/2016 | Sanghi et al. |
| 2016/0378545 A1 | 12/2016 | Ho |
| 2017/0003997 A1 | 1/2017 | Kelly et al. |
| 2017/0026975 A1 | 1/2017 | Maric et al. |
| 2017/0108912 A1 | 4/2017 | Li et al. |
| 2017/0111283 A1 | 4/2017 | Kumar et al. |
| 2017/0177222 A1 | 6/2017 | Singh et al. |
| 2017/0185545 A1 | 6/2017 | Kaushik et al. |
| 2017/0187846 A1 | 6/2017 | Shalev et al. |
| 2017/0222943 A1 | 8/2017 | Yao et al. |
| 2017/0228481 A1 | 8/2017 | Pusuluri et al. |
| 2017/0249098 A1 | 8/2017 | Petkov et al. |
| 2017/0249164 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0325124 A1 | 11/2017 | Mitra et al. |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0173643 A1 | 6/2018 | Yu et al. |
| 2018/0219976 A1 | 8/2018 | Decenzo et al. |
| 2018/0225251 A1 | 8/2018 | Sthoeger et al. |
| 2018/0239657 A1 | 8/2018 | Petrbok et al. |
| 2018/0295052 A1 | 10/2018 | St-Laurent |
| 2018/0357176 A1 | 12/2018 | Wang |
| 2018/0367460 A1 | 12/2018 | Gao et al. |
| 2019/0036893 A1 | 1/2019 | Jiang |
| 2019/0073011 A1 | 3/2019 | Paterson et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0253351 A1 | 8/2019 | Ihlar et al. |

FOREIGN PATENT DOCUMENTS

| | | |
|---|---|---|
| JP | 2012108677 A | 6/2012 |
| JP | 2013246642 A | 12/2013 |
| JP | 2015001867 A | 1/2015 |
| KR | 20150041072 A | 4/2015 |
| KR | 20150079788 A | 7/2015 |
| WO | WO-2008070138 A2 | 6/2008 |

OTHER PUBLICATIONS

Jackson, "PCI Express Technology", Sep. 2012 (Sep. 2012), MindShare Press, XP002777351, pp. 49,86,87,712-723.

PCI Express base Specification Revision 3.0, published Nov. 10, 2010.

PCI Express Base Specification Revision 3.1, published Oct. 8, 2014.

PCI Express Base Specification Revision 4.0 dated Oct. 5, 2017.

Universal Serial Bus, Communication Class, Subclass Specifications for Network Control Model (NCM) Devices; Revision 1.0 (Errata 1), Nov. 24, 2010, published by USB Implementers Forum, Inc.

Ma, Mingjin, "Principal and Architecture of PCI,PCI-X and PCI Express".

* cited by examiner

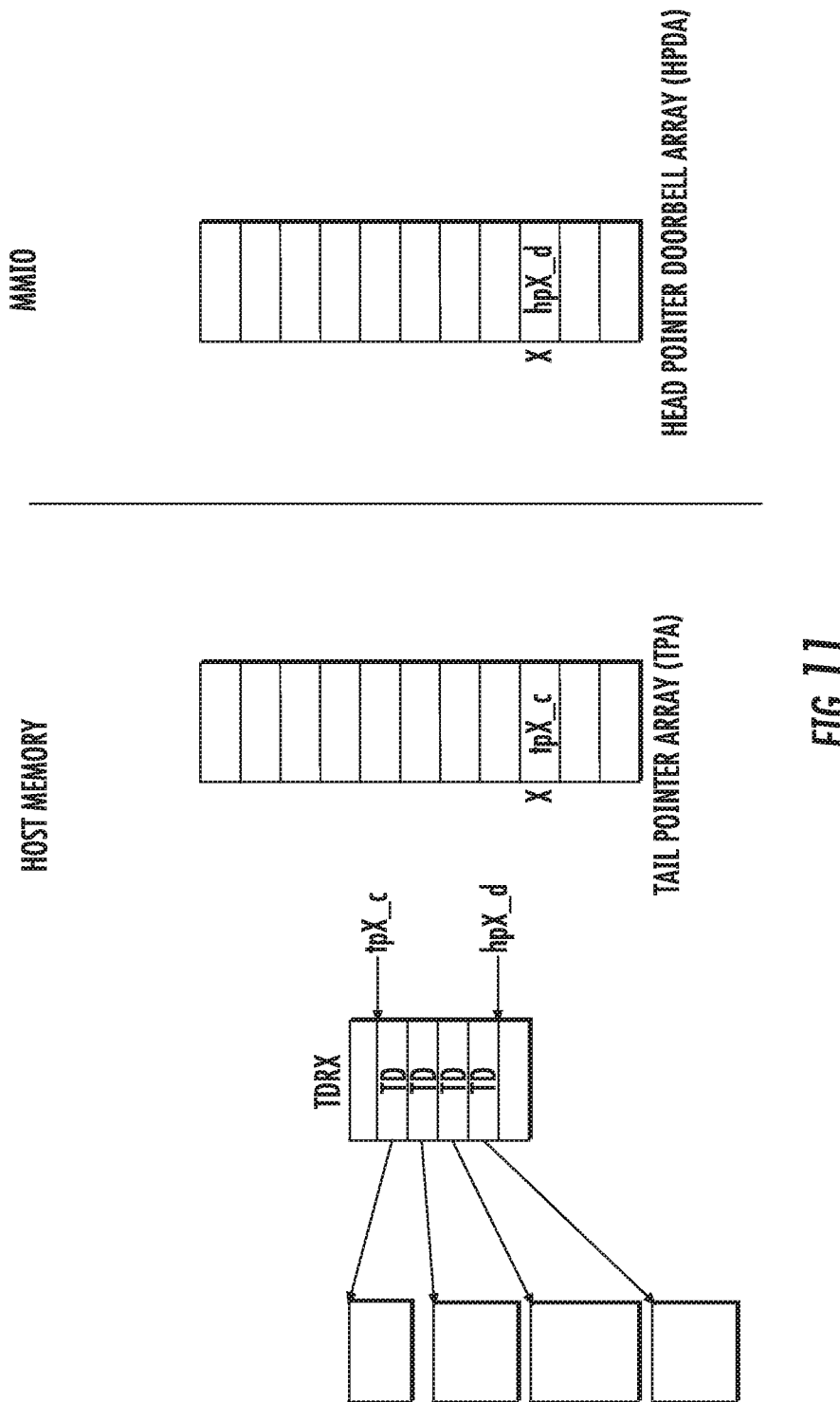

METHODS AND APPARATUS FOR RUNNING AND BOOTING AN INTER-PROCESSOR COMMUNICATION LINK BETWEEN INDEPENDENTLY OPERABLE PROCESSORS

PRIORITY AND RELATED APPLICATIONS

This application is a continuation of and claims the benefit of priority to U.S. patent application Ser. No. 16/133,543 of the same title filed Sep. 17, 2018 and issuing as U.S. Pat. No. 10,551,906, which is a divisional of and claims the benefit of priority to U.S. patent application Ser. No. 14/879,024 of the same title filed Oct. 8, 2015, issued as U.S. Pat. No. 10,078,361, which claims the benefit of priority to U.S. Provisional Patent Application Ser. No. 62/061,605 filed Oct. 8, 2014 and entitled "METHODS AND APPARATUS FOR AN INTER-PROCESSOR COMMUNICATION LINK BETWEEN INDEPENDENTLY OPERABLE PROCESSORS", each of the foregoing being incorporated herein by reference in its entirety.

This application is also related to commonly owned U.S. patent application Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed Oct. 8, 2015 and issued as U.S. Pat. No. 9,971,397, Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015 and issued as U.S. Pat. No. 9,798,377, Ser. No. 14/856,283 entitled "METHODS AND APPARATUS FOR AGGREGATING PACKET TRANSFER OVER A VIRTUAL BUS INTERFACE", filed Sep. 16, 2015 and issued as U.S. Pat. No. 9,830,289, and Ser. No. 14/870,923 entitled "METHODS AND APPARATUS FOR CONTROLLED RECOVERY OF ERROR INFORMATION BETWEEN INDEPENDENTLY OPERABLE PROCESSORS" filed Sep. 30, 2015, issued as U.S. Pat. No. 9,842,036; and commonly owned U.S. Provisional Patent Application Ser. No. 62/175,174 entitled "METHODS AND APPARATUS FOR SYNCHRONIZING UPLINK AND DOWNLINK TRANSACTIONS ON AN INTER-PROCESSOR COMMUNICATION LINK" filed Jun. 12, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of electronics devices, as well as networks thereof. More particularly, in one exemplary aspect, the disclosure is directed to methods and apparatus for implementing an inter-processor communication (IPC) link between two (or more) independently operable processors. Various aspects of the present disclosure are directed to, inter alia, run time processing, power management, boot sequencing and error handling.

2. DESCRIPTION OF RELATED TECHNOLOGY

Various bus architectures and techniques have evolved over time which are able to handle increasingly faster data rates, and to provide higher levels of data throughput. One such example is Peripheral Component Interconnect Express (PCIe); see e.g., PCI Express Base Specification Revision 3.1 dated Oct. 8, 2014, which is incorporated herein by reference in its entirety. PCIe is a high-speed serial computer expansion bus standard designed to replace older PCI and similar bus standards. Consistent with the foregoing, PCIe has historically been used as serial computer expansion bus technology, and has had limited applicability beyond such applications.

In terms of architecture, PCIe is based on point-to-point connectivity with separate serial links connecting every endpoint component (e.g., graphics card, memory, etc.) to the root complex (e.g., host processor).

PCIe has many desirable attributes in terms of, inter alia, performance and flexibility. However, PCIe (as well as some other existing "computer-centric" bus technologies) suffer certain disabilities, especially from the standpoint of portable consumer electronic device implementations. Specifically, as noted above, extant PCIe technologies were developed for use within desktop, server, and laptop computers, which are to varying degrees agnostic to many electrical power considerations affecting smaller portable devices. Desktops and servers (and to a lesser degree laptops) are less concerned with electrical power consumption/conservation, and more concerned with bus performance, ability to "hot plug", and the like. Accordingly, implementing a technology such as PCIe which, in its current incarnation, both (i) consumes significant electrical power during operation, and (ii) has limited power management infrastructure (e.g., application or host processor and chipset "sleep" states, and management of data and transactions during such sleep states), is generally unsuitable for portable consumer electronics applications where power consumption and battery conservation are critical (such as e.g., cellular- and Wi-Fi-enabled smartphones, "phablets", portable media players, etc.).

In a related aspect, extant PCIe connectivity is unable to accommodate scenarios where the "peripheral" processor is required to operate while the "host" processor is asleep or vice versa. Such operational scenarios and requirements are quite common with the aforementioned cellular devices, media players, and similar devices.

Hence, there is a need for improved apparatus and associated methods which can leverage the high data throughput and other desirable attributes of bus technologies such as PCIe (and other "memory mapped" technologies), yet support the requirements of rigorous power management and conservation, as well as the ability to support various combinations of operational sleep states or other reduced-power modes by various chipsets within the device (including e.g., wireless modems).

SUMMARY

The present disclosure satisfies the foregoing needs by providing, inter alia, methods and apparatus for implementing an inter-processor communication (IPC) link between two (or more) independently operable processors.

In one aspect, an apparatus is disclosed. In one embodiment, the apparatus includes: a first and a second processor coupled via a physical bus interface; and a computer readable medium comprising one or more computer readable instructions. In one exemplary variant, the computer readable instructions are configured to, when executed by the first processor, cause the first processor to: transmit a secondary boot stage image to the second processor; and the second processor is configured to, responsive to receiving the secondary boot stage image, complete a boot sequence.

In another embodiment, the apparatus includes: a first and a second processor coupled via a physical bus interface; and a computer readable medium comprising one or more computer readable instructions. In one exemplary variant, the computer readable instructions are configured to, when executed by the second processor, cause the second processor to: execute a primary boot sequence configured to cause the first processor to generate a secondary boot stage image; and the second processor is configured to, responsive to generation of the secondary boot stage image, execute the secondary boot stage image.

In another aspect, processor apparatus is disclosed. In one embodiment, the processor apparatus includes a first digital processor; a physical bus interface in data communication with the first digital processor; and a computer readable medium in data communication with the first digital processor. In one implementation, the computer readable medium includes computer readable instructions, the computer readable instructions configured to, when executed by the first digital processor, cause the first digital processor to transmit a boot stage image to a second processing entity via at least the physical bus interface.

In one variant, the processor apparatus includes a host processor apparatus, the physical bus interface includes an inter-processor communication (IPC) interface, and the second processing entity includes a peripheral component having a second digital processor. The transmission is configured to cause the peripheral component, responsive to receiving the boot stage image, to complete a boot sequence using at least the second digital processor.

In another embodiment, the processor apparatus includes a first digital processor; a physical bus interface in data communication with the first digital processor; and a computer readable medium in data communication with the first digital processor and comprising computer readable instructions, the computer readable instructions configured to, when executed by the first digital processor: cause the first digital processor to execute a primary boot sequence, the primary boot sequence configured to cause a digital processor other than the first digital processor to generate a secondary boot stage image, and cause transfer of the secondary boot stage image to the first digital processor; and responsive to receipt of the secondary boot stage image, execute the secondary boot stage image on the first digital processor.

In a further aspect, a method of initialization in a computerized apparatus is disclosed. In one embodiment, the method includes: executing on a first digital processor at least one computer program comprising a boot sequence; based at least in part on the executing, causing a digital processor other than the first digital processor to (i) generate a secondary boot stage image, and (ii) transfer the secondary boot stage image to the first digital processor; receiving the secondary boot stage image; and executing the secondary boot stage image on the first digital processor.

In one variant, the method further includes establishing an inter-processor communication link between at least the first digital processor and the digital processor other than the first digital processor; and the causing includes transmitting one or more communications via the inter-processor link from the first digital processor to the digital processor other than the first digital processor, the one or more communications transmitted at least after the executing of the at least one computer program has commenced.

In yet another aspect, integrated circuit (IC) apparatus is disclosed. In one embodiment, the integrated circuit apparatus is a System-on-Chip (SoC) device fabricated using a semiconductive fabrication process (e.g., 14 nm), and includes both a first digital processor and a second digital processor in data communication with the first digital processor via an inter-processor communications link. In one variant, the first and second digital processors include substantially similar first and second processor cores (e.g., a multi-core processor). In another variant, the first digital processor includes a primary processor (e.g., CPU), and the second digital processor includes a wireless base-band (BB) processor. In yet another variant, the second digital processor includes a graphics core (e.g., co-processor). In yet another variant, the SoC includes the primary processor, an auxiliary processor (e.g., ARM core or the like), and both the graphics core and the wireless BB core, each of the auxiliary, graphics and BB cores in inter-process communication with the primary processor. In another embodiment, the integrated circuit apparatus includes two or more discrete semiconductive die having one or more of the foregoing components disposed on each of the separate die.

In another aspect of the present disclosure, a method of executing a boot process in a computerized apparatus is disclosed. In one embodiment, the method includes: based on a determination that the second independently operable processor apparatus is performing a primary boot sequence from a storage location associated with the second independently operable processor apparatus, selecting one or more secondary boot stage images corresponding to one or more operations being performed as part of the primary boot sequence; and transmitting the selected one or more secondary boot stage images and the identified one or more additional secondary boot stage images to the second independently operable processor apparatus.

In another aspect of the present disclosure, an independently operable processor apparatus is disclosed. In one embodiment, the independently operable processor apparatus is configured to: read data written to a shared memory interface that is accessible by the independently operable processor apparatus and another independently operable processor apparatus; retrieve a plurality of secondary boot stage images from the another independently operable processor apparatus; execute at least a first portion of the retrieved plurality of secondary boot stage images subsequent to execution of an initial boot stage, and execute at least a second portion of the retrieved plurality of secondary boot stage images, at least the second portion being selectively assembled from the plurality of secondary boot stage images.

In another aspect of the present disclosure, an integrated circuit (IC) apparatus is disclosed. In one embodiment, the IC apparatus includes: a first digital processor apparatus; and inter-processor communication (IPC) interface apparatus. In one variant, the first digital processor apparatus is configured to: select one or more boot images; write one or more parameters and one or more transfer descriptors to a shared memory structure; enable access of the read one or more boot images by the second digital processor apparatus.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIGS. 9-11 are logical representations of one exemplary transfer descriptor ring (TDR) at various stages of processing, in accordance with the principles described herein.

FIGS. 9A-11A are logical representations of an alternate exemplary transfer descriptor ring (TDR) at various stages of processing, in accordance with the principles described herein.

Figure 1:
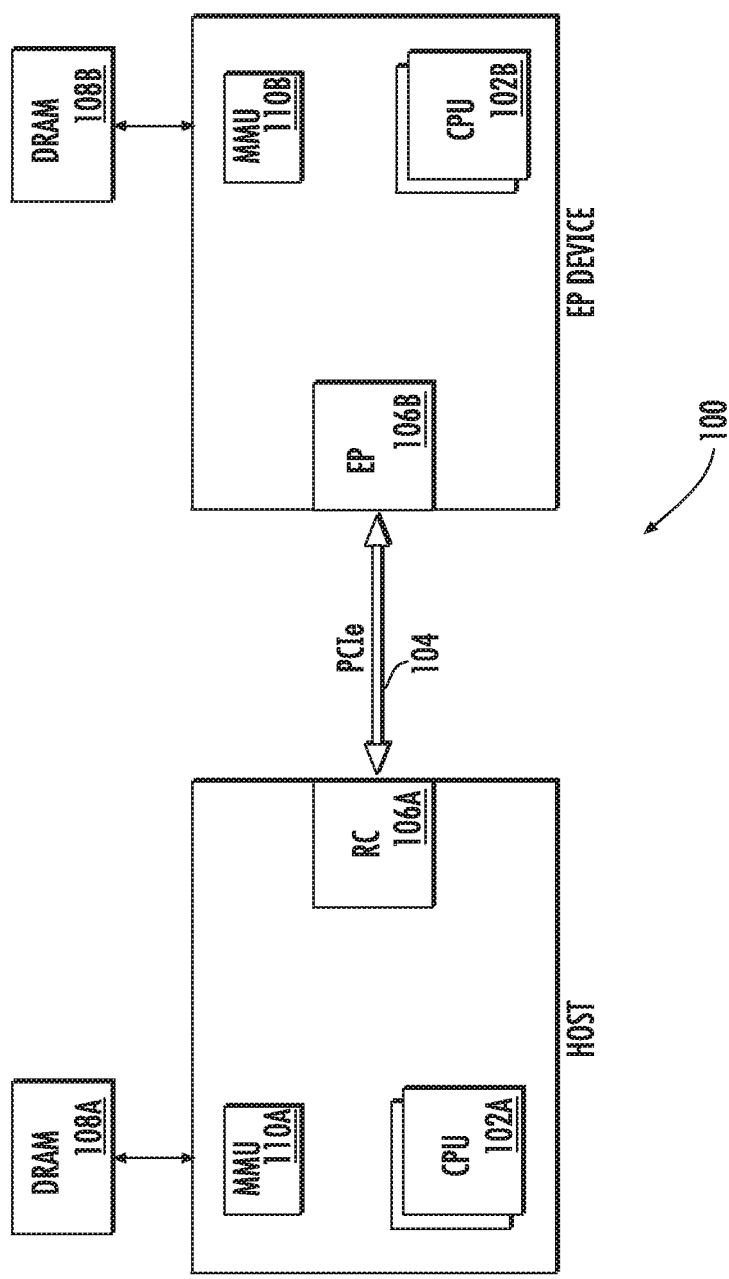
FIG. 1 is a logical block diagram of one exemplary apparatus useful for illustrating various principles described herein.

All Figures © Copyright 2014-2015 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/856,283 entitled "METHODS AND APPARATUS FOR AGGREGATING PACKET TRANSFER OVER A VIRTUAL BUS INTERFACE", filed Sep. 16, 2015 and issued as U.S. Pat. No. 9,830,289, previously incorporated by reference in its entirety), it will be recognized by those of ordinary skill that the present disclosure is not so limited. In fact, the various aspects of the disclosure are useful in any device or network of devices that is configured to incorporate and coordinate multiple independent processing elements, as is disclosed herein.

Various embodiments described herein may be used in conjunction with power management schemes such as those described within commonly owned U.S. patent application Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed on Oct. 8, 2015 and issued as U.S. Pat. No. 9,971,397, previously incorporated by reference in its entirety.

Additionally, various embodiments described herein may also be used in conjunction with error recovery schemes, such as those described within commonly owned U.S. patent application Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed on Oct. 8, 2015 and issued as U.S. Pat. No. 9,798,377, previously incorporated by reference in its entirety.

Further, while the following embodiments describe specific implementations of e.g., dedicated address spaces, legacy support capabilities, and specific protocols, those of ordinary skill in the related arts will readily appreciate that such descriptions are purely illustrative.

Moreover, while exemplary implementations are described in the context of the PCIe protocol, it will be appreciated that the various features and techniques described herein can be applied to other bus protocols, including especially those based on memory-mapped schemes.

Exemplary Inter-Processor Communications Link

As previously noted, bus techniques have evolved which are able to handle faster data rates and provide higher levels of data throughput. One such example is Peripheral Component Interconnect Express (PCIe). PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for most portable consumer electronics applications. Additionally, PCIe connectivity is unable to accommodate scenarios where the "peripheral" processor is required to operate while the "host" processor is asleep or vice versa (as is common with cellular devices and portable media players).

Within this context, exemplary methods and apparatus are now described which support an inter-processor communication (IPC) link between two (or more) independently operable processors. The following discussions will be described in reference to a "root complex" (RC) (or "host") processor, and an "endpoint" (EP) (or "peripheral") processor. For reasons which will become apparent below, it is appreciated that the designation as to host or peripheral processor is used to simplify and/or clarify the following explanations, and does not imply existing host or peripheral functionality, or that such roles cannot be reversed.

In one aspect, the IPC protocol is based on a "shared" memory interface for run-time processing (i.e., the independently operable processors each share, either virtually or physically, a common memory interface). In one such embodiment, the shared memory interface provides a multi-channel IPC path for high throughput transfers. In one exemplary implementation, the shared memory interface remains functional when any one of the independently operable processors is active, even when one or more of the remaining independently operable processors are asleep, powered down, powered off, etc.

In another aspect, the IPC communication link is configured to support a host-driven boot protocol used during a boot sequence, so as to establish a basic communication path between the peripheral and the host processors. In one exemplary embodiment, the host processor maps the entire boot image to a contiguous area of memory, and provides the base address and size of the image over the IPC communication link to the peripheral processor.

Various other embodiments described herein include, inter alia, sleep procedures (as defined separately for the host and peripheral processors), and error handling.

As used herein, the term "logical" or "virtual" are interchangeably used to refer to, without limitation, an abstraction (typically performed in software or machine logic) to represent physical mechanisms, attributes or functionalities as a data structure. For example, as used herein a "logical bus interface", "virtual bus interface", etc. refers generally to an abstraction or representation of a bus interface as a series of data structures. In contrast, as used herein a "physical bus interface" refers to the physical mechanisms, attributes or functionalities of a physically tangible bus interface.

As used herein, the term "in-band" refers without limitation to data transactions which are transacted within a logical or physical interface, and which affect the mechanisms, attributes or functionalities of the logical or physical interface. In contrast, the term "out-of-band" refers to data transactions which are not transacted within a logical or physical interface, and which affect the mechanisms, attributes or functionalities of the logical or physical interface.

FIG. 1 illustrates exemplary apparatus 100 useful for illustrating various principles described herein. As shown, the apparatus 100 includes a first and second processor (102A, 102B), and a physical bus interface 104 that is configured to implement an inter-processor communication (IPC) link between two (or more) independently operable processors.

In one implementation, the first processor 102A includes an applications processor (AP). As shown in FIG. 1, the first processor 102A is coupled to a Root Complex (RC) 106A which functions as the host of the IPC bus.

In one implementation, the second processor 102B includes a wireless modem. As used herein, the term "wireless" includes, without limitation, Long Term Evolution/Advanced (LTE and LTE-A) technology, devices implementing IEEE-Std. 802.11 (any variants thereof), PAN technology such as e.g., Bluetooth or IEEE Std. 802.15.4, "ZigBee", near field communication/RFID, WiMAX (IEEE 802.16), WMANs, 3G cellular (e.g., WCDMA, 3GPP, 3GPP2, and GSM and improvements thereon, and ISM band devices.

In other embodiments, the second processor 102B may be e.g., a media processor, or other network processing element. As shown in FIG. 1, the second processor 102B is coupled to an Endpoint (EP) 106B which functions as the peripheral of the IPC bus.

As shown, both the first and the second processors (102A, 102B) are each coupled to a non-transitory computer readable medium (e.g., dynamic random access memory (DRAM)) (108A, 108B) and a memory management unit (MMU) (110A, 110B). The non-transitory computer readable medium is configured to store computer readable instructions for execution.

Figure 2:
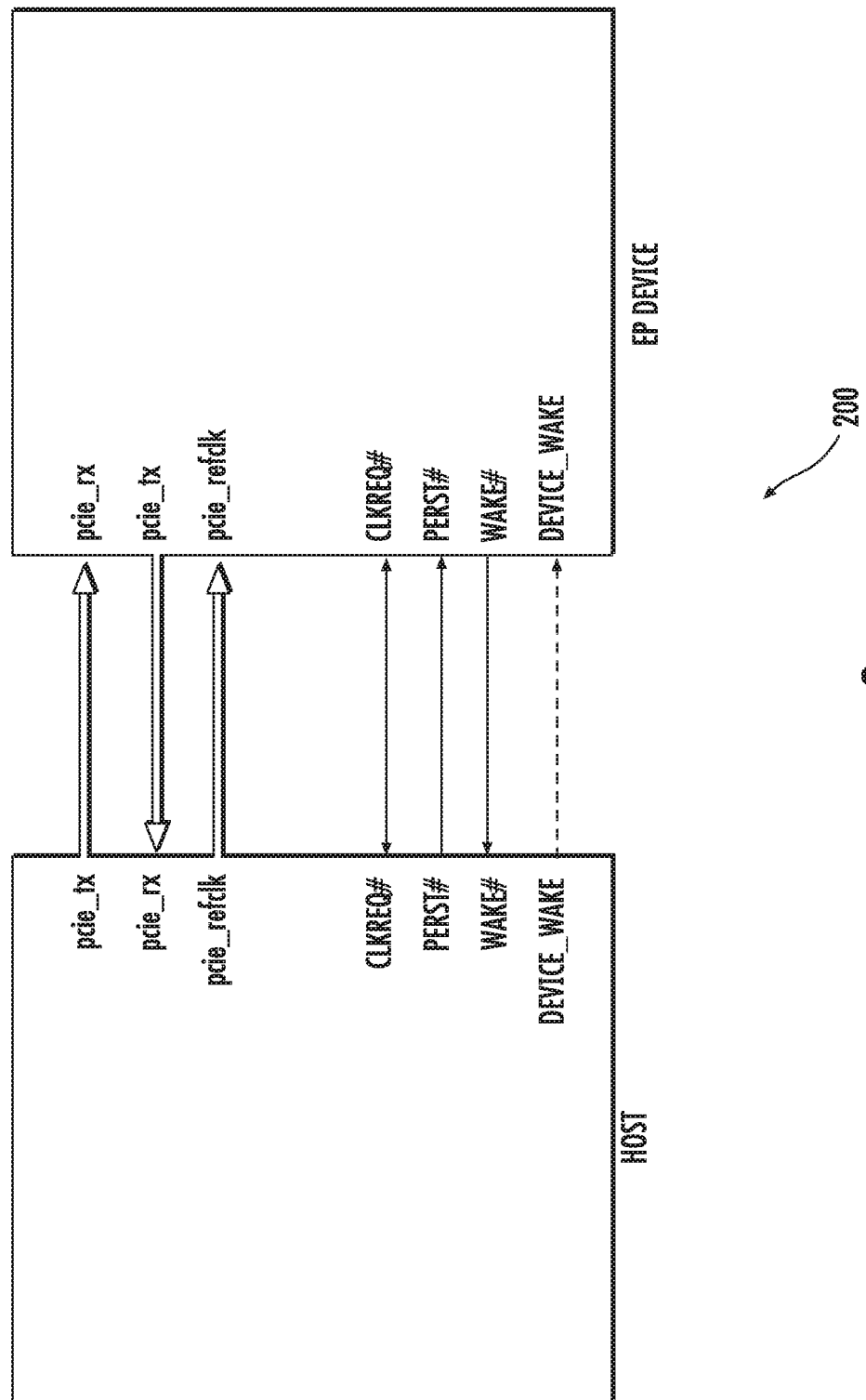
FIG. 2 is a logical block diagram of one exemplary physical bus interface useful in conjunction with the various principles described herein.

As shown in FIG. 2, the physical bus interface 104 is loosely based on the Peripheral Component Interconnect Express (PCIe) standard (e.g., as is described in "PCI Express Base Specification Revision 3.0" published Nov. 10, 2010, and "ECN L1 PM Substrates with CLKREQ" approved Aug. 23, 2012, incorporated by reference herein in their entireties). Those of ordinary skill in the related arts, given the contents of the present disclosure, will readily appreciate that other bus interface standards may be substituted with equal success. Various modifications to the underlying physical bus interface 104 (and protocols used therewith) to support IPC functionality is described in greater detail hereinafter.

In the exemplary embodiment, the physical bus interface 104 is a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (pcie_rx, pci_tx). Each lane is a full-duplex byte stream, transporting data packets in eight-bit 'byte' formats, between the RC and EP of a link, in both directions simultaneously. The physical IPC link 104 can support multiple logical links (or virtual bus interfaces) representing multiple ongoing data sessions.

In one such embodiment, each virtual bus interface further includes one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

Exemplary Boot Sequencing—

Figure 3:
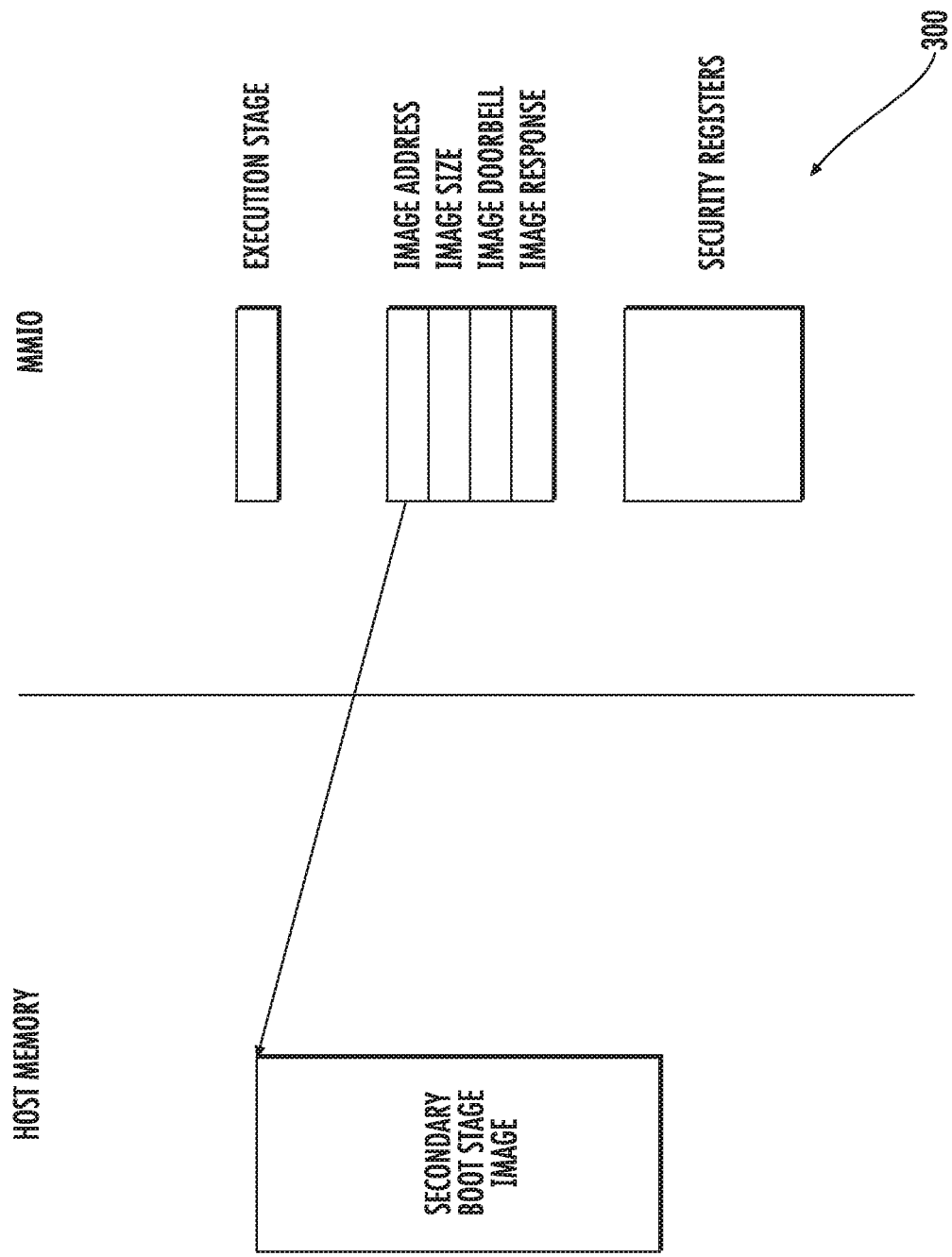
FIG. 3 is a logical representation of a shared memory interface configured to enable host assisted boot sequencing, in accordance with one implementation of the present disclosure.

In one aspect, the computer readable instructions, when executed by at least one of the first or second processors (102A, 102B) is configured to enable host assisted boot sequencing. FIG. 3 describes an exemplary embodiment where the peripheral processor does not have a complete boot image stored in e.g., Flash memory (i.e., operates as a "flashless" EP device); accordingly, the host processor must initialize the peripheral processor to the next (secondary) boot stage image and switch the peripheral processor execution to the next boot stage image. In typical implementations, the next boot stage image can be entirely mapped within contiguous memory; the host processor can provide the base address and size of the image over the memory mapped input/output (MMIO) of the EP device (which, as described hereinafter, resides virtually within shared memory space). Thereafter, the EP device receives the next boot stage image. In one such variant, the next boot stage image is provided over the IPC link. In some cases, the peripheral processor additionally reports a success or failure status to the host processor before switching to run time operation.

In one exemplary embodiment, the peripheral processor also updates the current execution stage in the MMIO space (which exposes the peripheral processors current execution stage to the host processor), thereby enabling simultaneous access during boot operations (and other operations e.g., run-time, etc.). In some variants, the EP device can expose security-related information over MMIO during boot sequencing.

Figure 4:
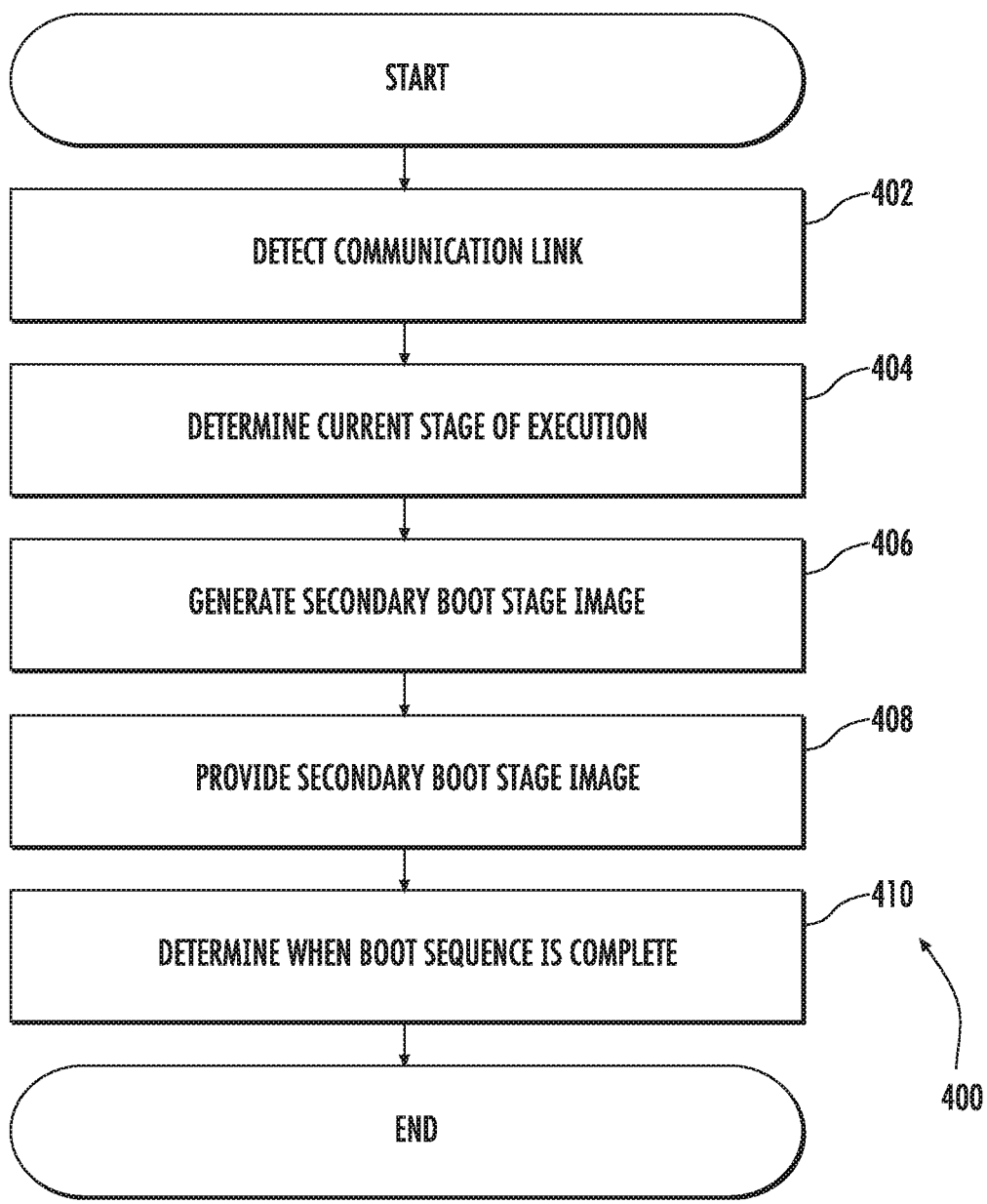
FIG. 4 is a generalized logical flow diagram illustrating an exemplary boot process for a host processor, in accordance with one implementation of the present disclosure.

The following discussion of FIG. 4 details one exemplary boot process 400 for the host processor.

At step 402, a communication link is detected by the host processor, and the peripheral processor is enumerated. In one exemplary implementation, the communication link is an IPC link that is loosely based on PCIe (such as is illustrated within FIG. 2, described supra), the host processor includes a Root Complex (RC) and the peripheral processor includes an Endpoint (EP). In one such variant, the enumeration process includes an initial query of the devices connected to the host processor (e.g., the aforementioned peripheral processor) and an assignment of each connected device to address.

At step 404, the communications link driver on the host processor determines the peripheral processor's current stage of execution. In one exemplary embodiment, the host processor reads a register within a shared memory interface (e.g., a mapped input/output (MMIO)) to determine the execution stage.

At step 406, when the host processor determines that the peripheral processor is in a primary boot sequence (e.g., executed from a boot read only memory (ROM) local to the peripheral processor), then the host processor loads an appropriate driver and generates/retrieves an appropriate secondary boot stage image therewith.

At step 408, the host processor provides the secondary boot stage image to the peripheral processor. In one exemplary embodiment, the host processor maps the secondary boot stage image to the shared memory interface (e.g., MMIO). In some variants, the secondary boot stage image has been optimized as a single contiguous image to optimize processing. However, those of ordinary skill in the related arts will readily appreciate (given the contents of the present disclosure), that excessive ranges of contiguous portions of memory may not be ideal for other reasons e.g., for memory management. Additionally, the secondary boot stage image may be limited in size (i.e., may not exceed a maximum size) so as to comply with communication link requirements.

In some embodiments, the provisioning of the secondary boot stage image includes writing a base address and size of the secondary boot stage image (or memory buffer containing it) to the appropriate image address and image size registers of the shared memory interface. Thereafter, the host processor can notify the peripheral processor of the secondary boot stage image by e.g., writing to an image "doorbell" register of the MMIO to instruct the peripheral processor to start processing the image. Responsive to the doorbell, the peripheral processor will retrieve the image. When the peripheral processor has read and processed the image, the peripheral processor will notify the host by sending an interrupt. In one embodiment, the notification is a message signaled interrupt (MSI or MSI vector) (a PCIe-based mechanism that allows the EP device to send an interrupt to the host). In some cases, the notification may have a dedicated mechanism (e.g., a designated vector number).

As used herein, a "doorbell" signal refers to any signal, register, or interrupt that is used by the host to indicate to the peripheral that there is some work to be done (e.g., data processing, control flow, etc.). Analogously, as used herein, the MSI is used by the peripheral to notify the host of work to be done. For example, in one exemplary implementation, one processor (e.g., the host) will place data in a shared memory location(s), and "ring the doorbell" by writing to a designated memory location (the "doorbell region"); responsively, the peripheral processor can process the data.

Accordingly, at step 410, when the host processor receives the notification, the host processor reads the image response register to determine whether the boot sequence has completed. Upon successful completion (or alternatively, when the next execution stage is started), the host loads a run time communication link driver.

Figure 5:
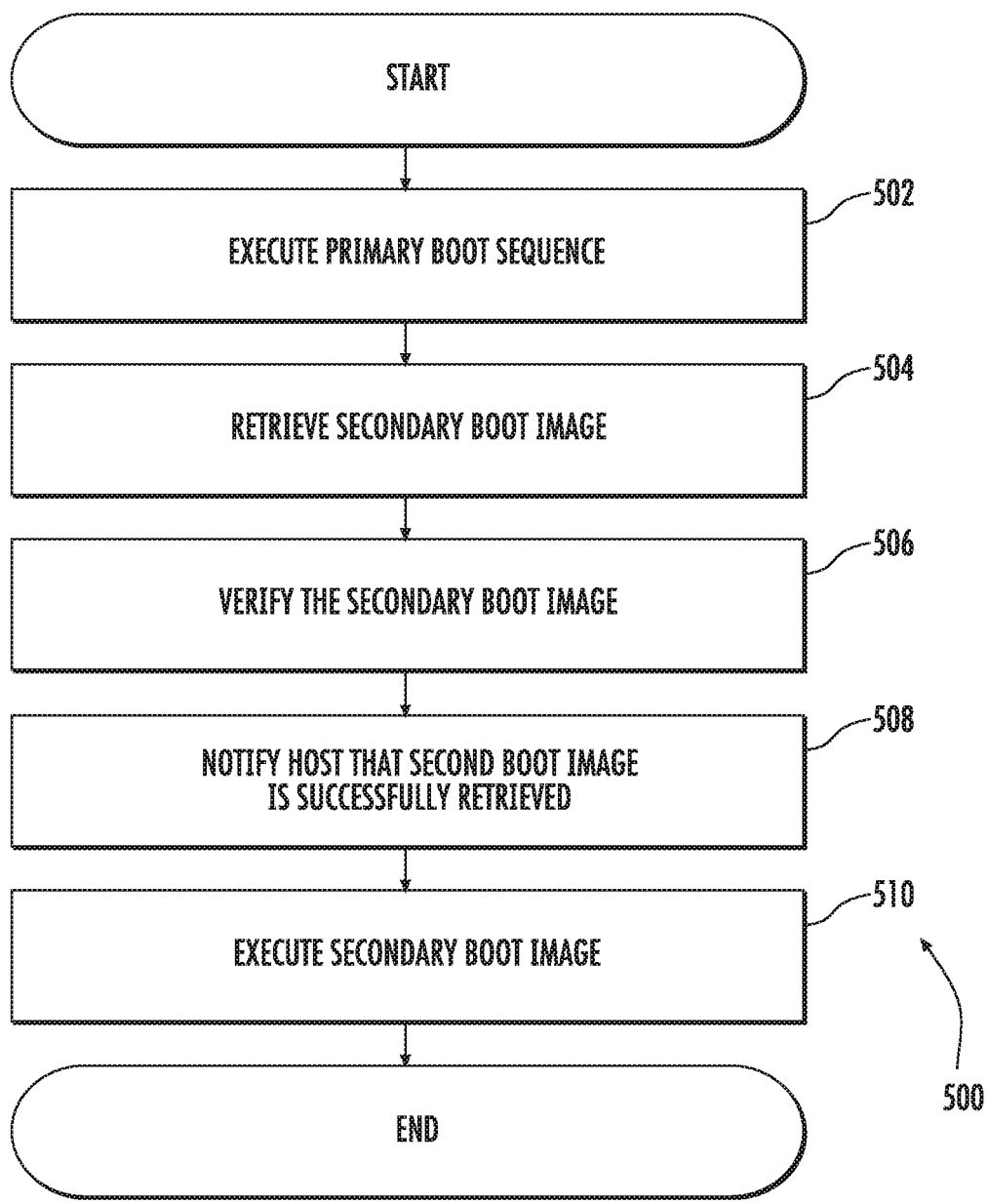
FIG. 5 is a generalized logical flow diagram illustrating an exemplary boot process for a peripheral processor, in accordance with one implementation of the present disclosure.

The following discussion of FIG. 5 details one exemplary boot process 500 for the peripheral processor.

In one embodiment, the execution stage register of the shared memory interface for the peripheral processor is set to default to boot from its local memory (e.g., boot ROM mode). Those of ordinary skill in the related arts, given the contents of the present disclosure, will appreciate other applicable boot schemes suitable herewith.

At step 502, the peripheral processor executes an initial primary boot sequence which may include e.g., a Link Training and Status State Machine (LTSSM) (such as the type described within the PCIe specification, previously incorporated by reference supra) and enumerating the peripheral processor to a communication link of a host processor.

At step 504, thereafter, responsive to receiving a notification from the host processor, the peripheral processor retrieves one or more secondary boot images. In one exemplary embodiment, the notification is an image doorbell register of the MMIO that signifies that the secondary boot image is available. Responsive to the doorbell, the peripheral processor will retrieve the image based on e.g., image address and image size registers of the shared memory interface. In one exemplary embodiment, the retrieval comprises a direct memory access (DMA) of the shared memory interface, which is executed via the communication link.

Those of ordinary skill in the related arts will recognize that any number of secondary boot stage images may be used (including subsequent tertiary, quaternary, etc. stages) to support varying levels of boot sequence complexity. For example, a first secondary boot stage and a second secondary boot stage may be executed from the primary boot stage; and subsequently, one of the secondary boot stages may additionally incorporate subsequent tertiary boot stages, etc.

At step 506, the peripheral processor may first verify, or validate the image to ensure that the image is e.g., secure, and not corrupted. Common examples of validation include e.g., certificate authentication, cyclic redundancy checks (CRC), parity checks, etc.

When the peripheral processor successfully retrieves the secondary boot stage image, the peripheral processor sets the image response register and sends a notification to the host processor (step 508) (within the MMIO or the shared host memory). Thereafter, the peripheral processor executes the secondary boot stage image (step 510). Otherwise, if the peripheral processor fails to retrieve the secondary boot stage image (or if an invalid condition is met e.g., corrupt boot image, etc.), then the peripheral processor triggers a fatal error condition.

In the event of a fatal error condition, the host processor will perform error recovery procedures. In some variants, the host processor will responsively reset the peripheral processor. In other variants, the host processor will abort the peripheral processor boot. Various other error recovery schemes are described in greater detail hereinafter.

Exemplary Run Time Processing—

Figure 6:
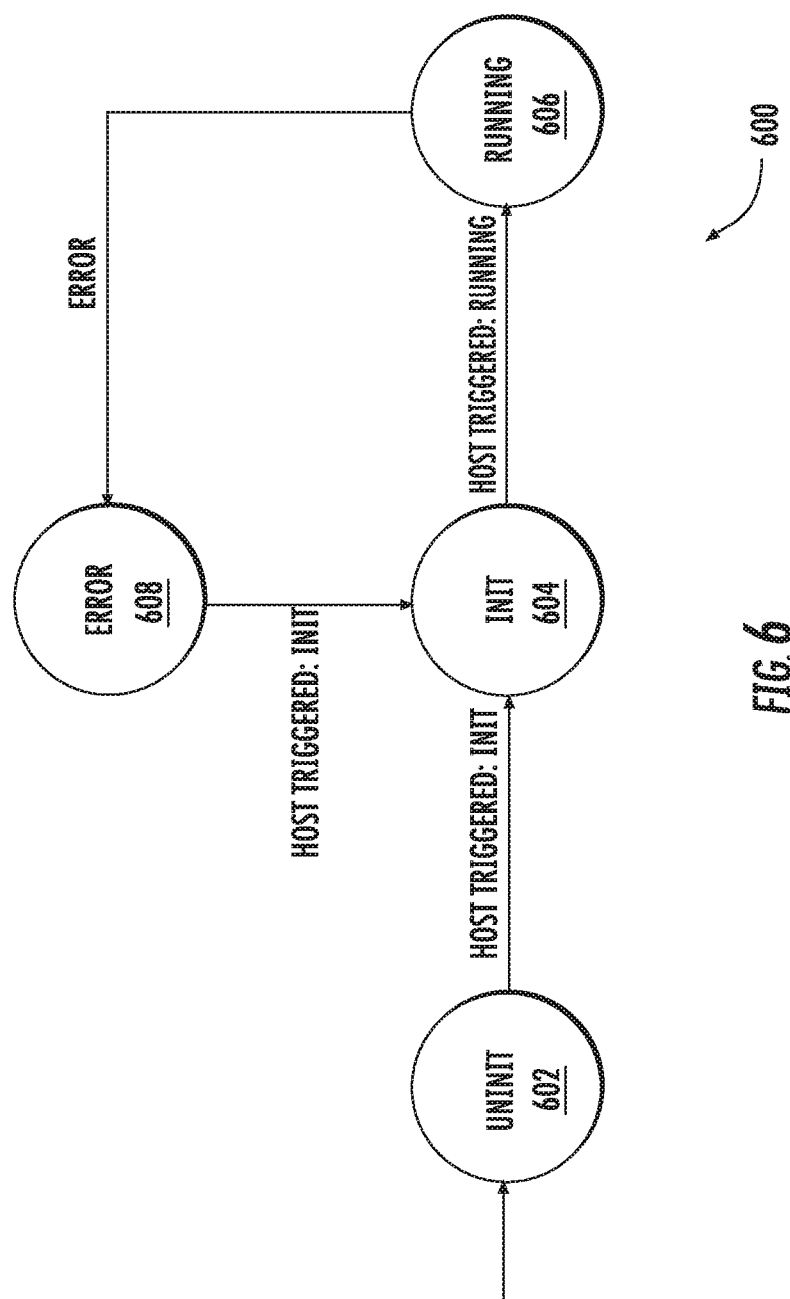
FIG. 6 is a logical block diagram of an exemplary run time operation state machine useful in conjunction with the various described embodiments.

In one aspect, the computer readable instructions, when executed by at least one of the first or second processors (102A, 102B) is configured to transact data via a run time processing protocol that is based on a shared memory architecture. FIG. 6 illustrates one exemplary embodiment of a Run Time IPC State Machine 600. In the exemplary embodiment, the first and second processor share a shared memory interface that includes a memory mapped input/output (MMIO) space.

In one embodiment, the state machine comprises four (4) states; in one exemplary variant, the four (4) states are controlled by two registers in the MMIO: IPC Status, and IPC Control. IPC Status is read-only for the host processor and read/write for the peripheral processor and reflects the peripheral processor's IPC state machine. IPC Control is write-only for the host and read-only for the peripheral processor. IPC Control allows the host processor to trigger IPC state machine transitions. Writing to IPC Control triggers an interrupt for the peripheral processor.

In the exemplary embodiment of FIG. 6, the Run Time IPC State Machine starts in the UnInit State 602 (e.g., a default state from reset, power-down, power-off, etc.) When the host processor writes an initialize command to the IPC Control register, the state machine changes to the Init State 604. Responsively, the peripheral processor sets up and initializes its local data structures, and updates the IPC Status register to signal that the Init State 604 has completed. In some embodiments, the peripheral processor may additionally notify the host processor (e.g., with a message signaled interrupt (MSI) i.e., a PCIe-based mechanism that allows the peripheral processor to send an interrupt to the host processor). Concurrently, the host processor can initialize its own data structures; when the host processor receives the notification, it checks the IPC Status register to detect the completed change to Init State 604.

From the Init State 604, the host processor updates the shared memory interface (e.g., the MMIO register Context Information Address) and triggers the transition to the Running State 606 by writing a run command to the IPC Control register. Responsively, the peripheral processor reads the Context Information and updates the IPC Status register to Running.

As described in greater detail hereinafter, in the Running state 606, data transfers can take place between the host and the peripheral processor; however, in the event of an error condition on either the host or the peripheral processor, the IPC state machine transitions to the Error State 608. The host informs the peripheral processor of an error by writing an error flag to the IPC Control register. In contrast, the peripheral processor informs the host processor of an error (internal or host initiated), by updating the IPC Status register to Error.

From the Error state 608, the peripheral processor clears its current Context Information Address and terminates further host memory access. In some cases, the peripheral processor may store a mirror copy of a few critical peripheral processor registers i.e. Execution Stage Mirror and IPC Status Mirror, in the host memory (in a location specified for device information). Once the peripheral processor has the device information address, it updates the mirror copy of these registers in host memory each time the local register changes, followed by a MSI. The IPC Status Mirror is updated by the peripheral processor as part of the Running and Error States (606, 608).

Referring back to the Running State 606 of FIG. 6, in one exemplary embodiment, data transfers are performed as a series of data transactions over unidirectional "pipes". A pair of pipes creates a bi-directional interface. While the following discussion is provided within the context of a "full-duplex" scheme, those of ordinary skill in the related arts will readily appreciate that the described protocols may be substituted with equal success with so-called "half duplex" schemes, given the contents of the present disclosure.

In one exemplary embodiment, a client service (e.g., control, data, trace, etc. associated with a data session) is associated with a single interface i.e. a pair of pipes. Each client service input/output (I/O) may be composed of multiple so-called "transfer descriptors" (TD). For example, a single TD may describe a physically contiguous memory buffer, accessible by the host/peripheral processor over the communication link.

Each pipe (i.e., data stream) is associated with one "transfer descriptor ring" (TDR). The TDR data structure resides in host processor memory and is accessible by the peripheral processor. Each TDR is described by a head pointer and a tail pointer, and encompasses one or more TD; each TD includes: an address of a buffer in host memory, a size of the buffer, a next count that indicates the number of TDs remaining in an I/O transfer, and a completion status. The head pointer points to the next empty slot in the TDR, whereas the tail pointer points to the address of next TD which the peripheral will process. The head pointer is written by the host and read by the peripheral. The tail pointer is read by the host and written by the peripheral. All TDs and associated data buffers between the tail pointer and the head pointer are associated with the peripheral processor. When the head pointer is equal to the tail pointer, the TDR is empty.

The peripheral processor provides an array of so-called "doorbell" registers, and a so-called "head pointer doorbell array" (HPDA) which is further indexed by pipe number. The host processor notifies the peripheral processor of a new TD in a TDR by writing the head pointer value in the doorbell register at a pipe number offset inside the HPDA. Similarly, the host provides a so-called "tail pointer array" (TPA) in host memory that is indexed by pipe number, which is updated by the peripheral processors with tail pointer values to indicate completion of a TD.

Figure 7:
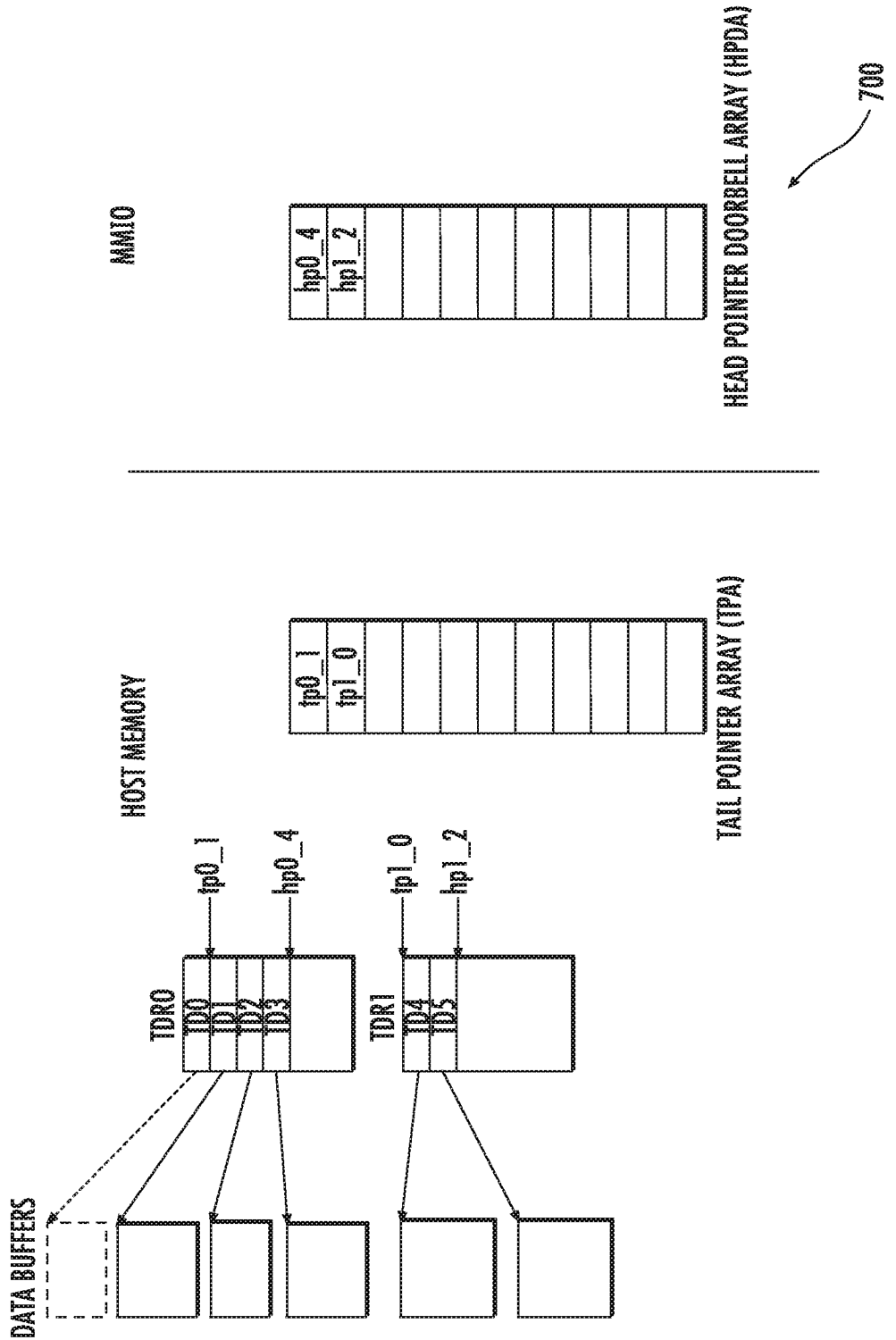
FIG. 7 is a logical representation of one exemplary dual pipe data structure comprising two (2) transfer descriptor ring (TDR) data structures each of which comprises a number of transfer descriptors (TDs), useful in conjunction with the various described embodiments.

FIG. 7 illustrates one exemplary data structure 700 described supra. The data structure 700 includes a first pipe (TDR0) in the uplink direction (from the host to the peripheral), and a second pipe (TDR1) in the downlink direction (from the peripheral to the host). As shown, the host processor has queued four (4) TDs in TDR0 for uplink transfer and informed the peripheral processor by writing the address (hp0_4) at the TDR0 head pointer offset in the HPDA (0). After the peripheral processor has successfully transmitted the data for TD0, it updates the TPA entry (0) by writing a new tail pointer address (tp0_1). When the peripheral processor updates the appropriate TPA entry, the host can free the corresponding data buffer from memory.

Similarly, as shown, the host has queued two (2) TDs in TDR1 for downlink transfer and informs the peripheral process device by writing hp1_2 at offset 1 in HPDA. Once the peripheral processor consumes these TDs, it will update TPA to inform the host.

In some implementations, the TDs may be "aggregated" into a larger scatter-gather TD to support so-called "scatter-gather" behavior for large I/O transfers (e.g., each procedure-call sequentially writes data from multiple buffers to a single data stream or reads data from a data stream to multiple buffers; the so-called "scatter/gather" refers to the process of gathering data from, or scattering data into, the given set of buffers.)

Figure 7A:
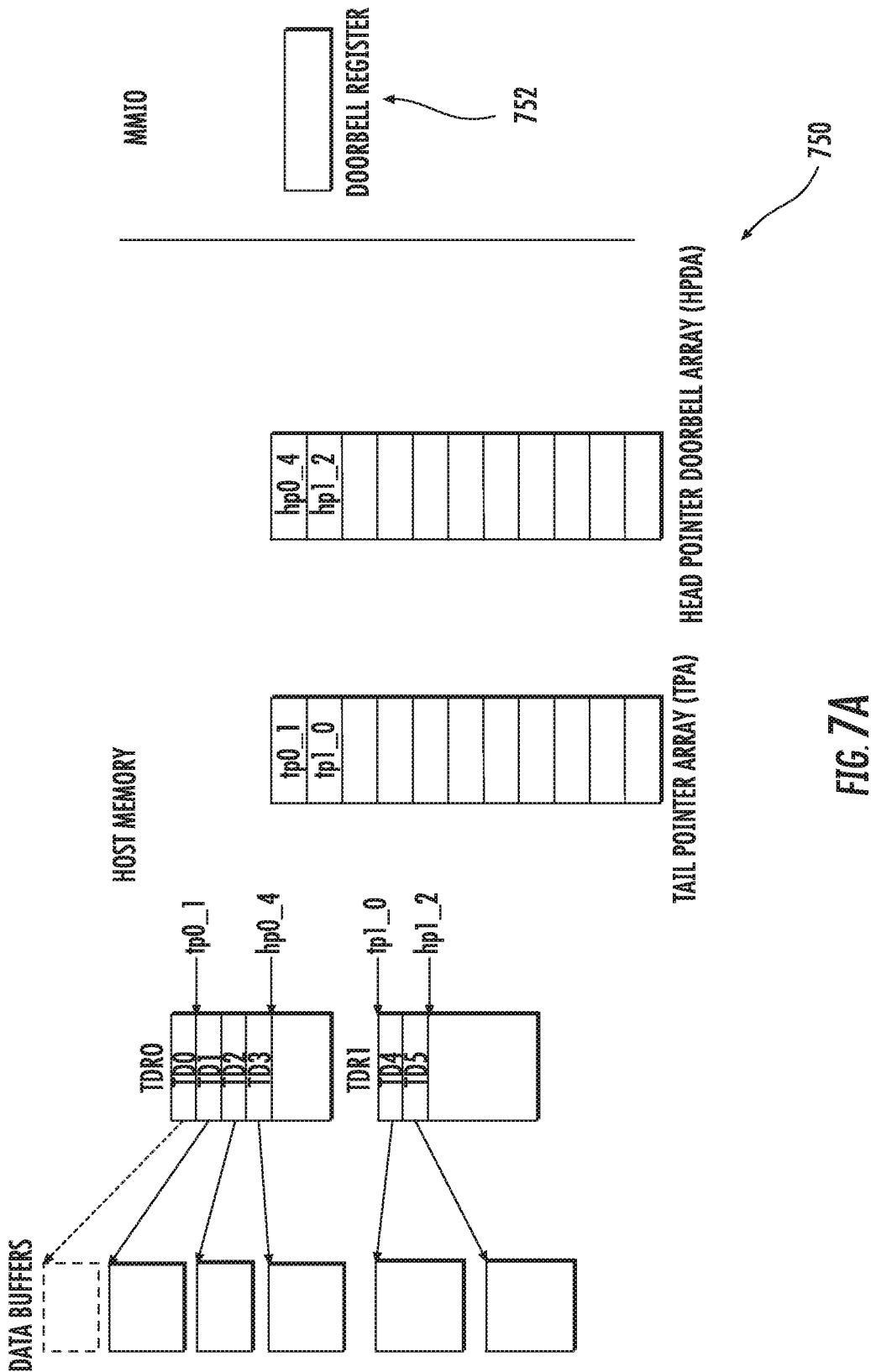
FIG. 7A is a logical representation of an alternate exemplary dual pipe data structure comprising two (2) transfer descriptor ring (TDR) data structures each of which comprises a number of transfer descriptors (TDs), useful in conjunction with the various described embodiments.

FIG. 7A illustrates an alternate exemplary data structure 750 described supra (here, with a "doorbell register" 752 disposed in the MMIO, and the doorbell array disposed in the host processor (e.g., AP).

Figure 8:
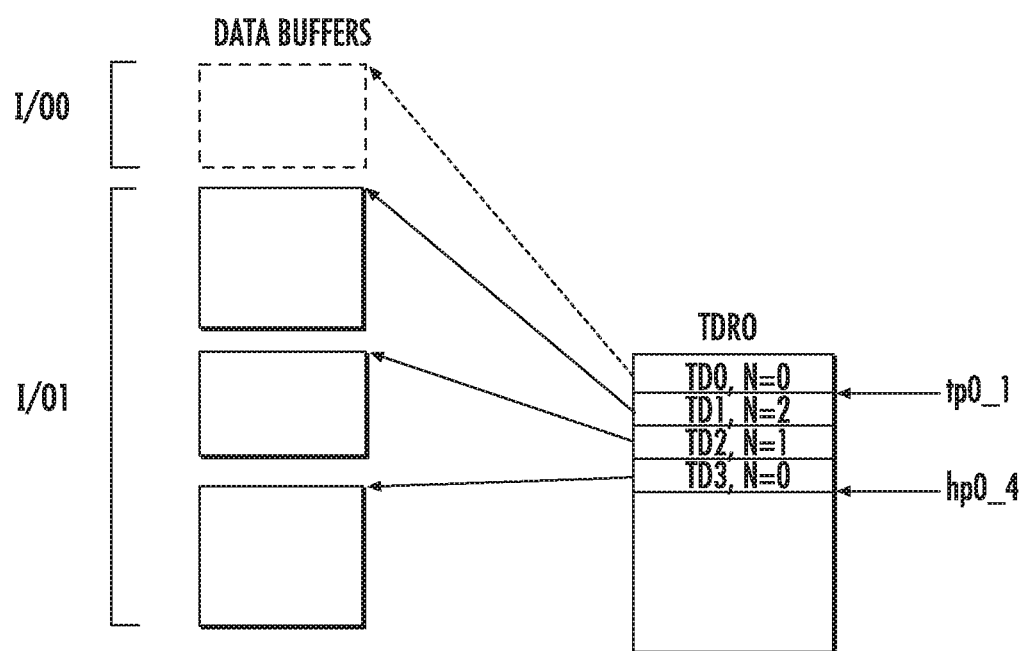
FIG. 8 is a logical representation of one exemplary scatter-gather input/output (I/O) transfer, useful in conjunction with various described embodiments.

FIG. 8 illustrates one exemplary scatter-gather TD 800 which is described by three (3) TDs according to an exemplary "scatter-gather" scheme. Each TD indicates the remaining count of TDs in the aggregate scatter-gather TD. For example, as shown, I/O1 includes TD1 which continues to TD2 (two (2) TDs remain e.g., N=2), and TD2 continues to TD3 1 (one (1) TD remains N=1), and TD3 points to TD0 which is the last descriptor in the transfer (N=0, no remaining TDs). Each TD contains a pointer to the data buffer in host memory (indicating the address to be accessed by the peripheral to perform the data transfer) and a size field (indicating the size of the data transfer). For uplink TDRs, the size field is read-only for the peripheral, whereas for downlink TDRs the size field may be read/write for the peripheral. During a downlink transfer, the peripheral reads the size field to determine the maximum size of the buffer available. After the downlink transfer, the peripheral may update the size field with the actual size of data written into the buffer.

Figure 8A:
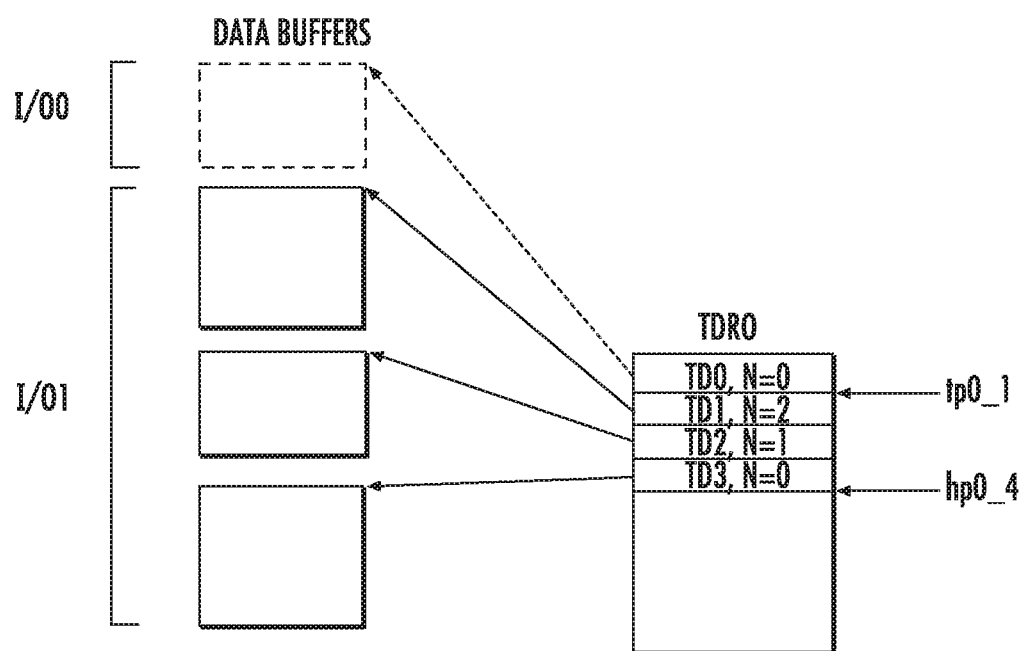
FIG. 8A is a logical representation of an alternate exemplary scatter-gather input/output (I/O) transfer, useful in conjunction with various described embodiments.

FIG. 8A illustrates an alternate exemplary scatter-gather TD 850, which is described by three (3) TDs according to an exemplary "scatter-gather" scheme, and which is useful with the data structure 750 of FIG. 7A.

Figure 9:
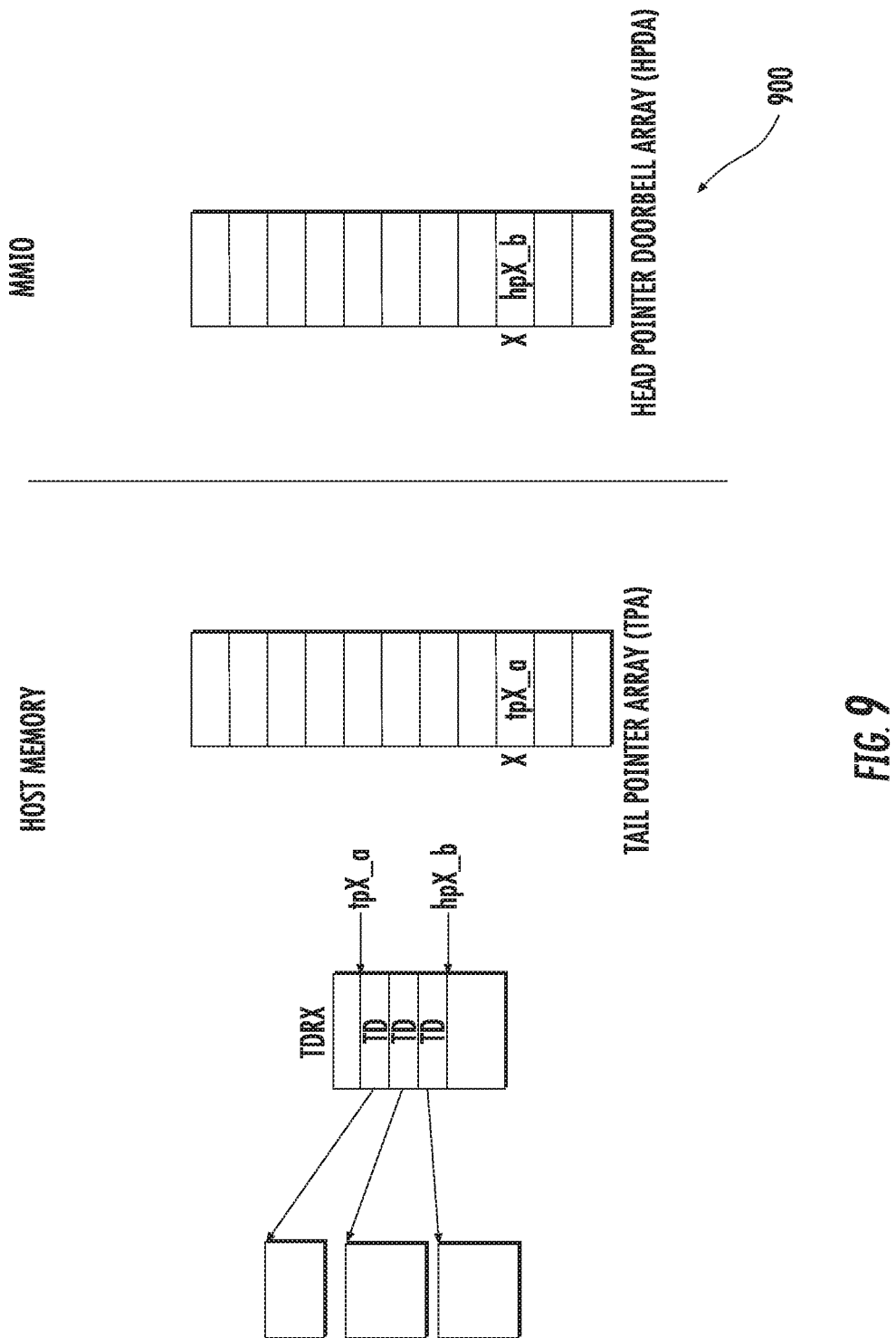
Figure 9A:
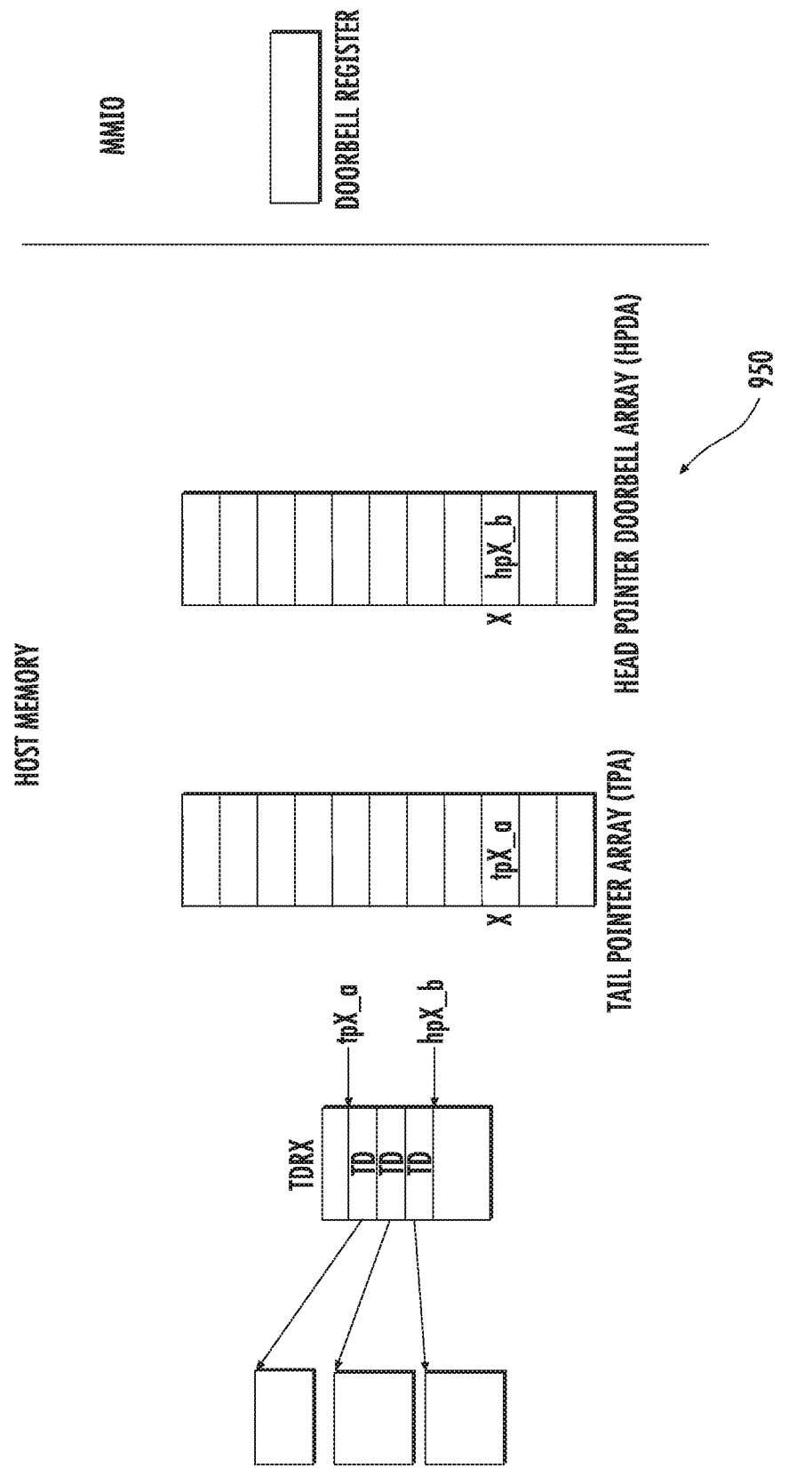
Figure 10:
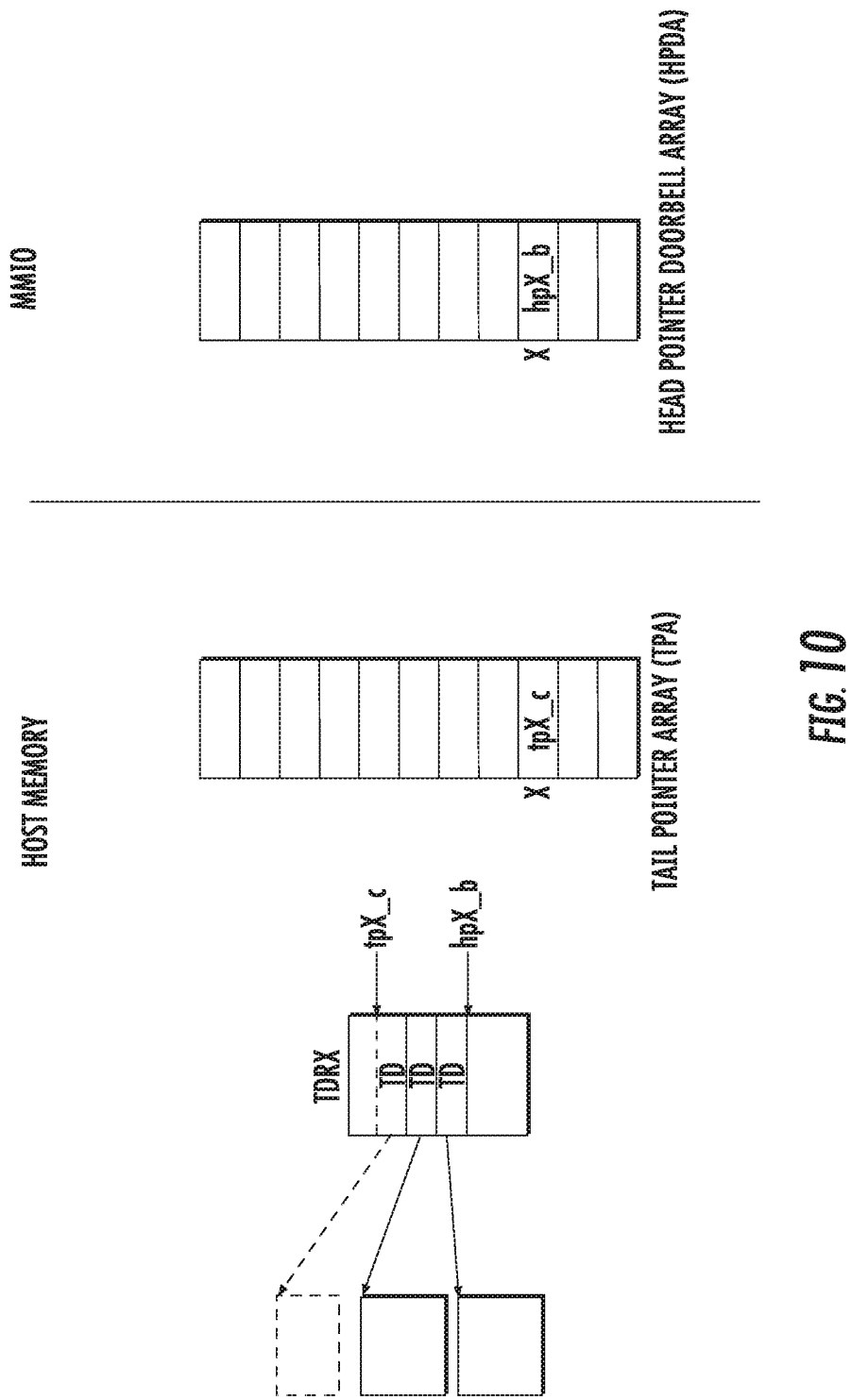
Figure 10A:
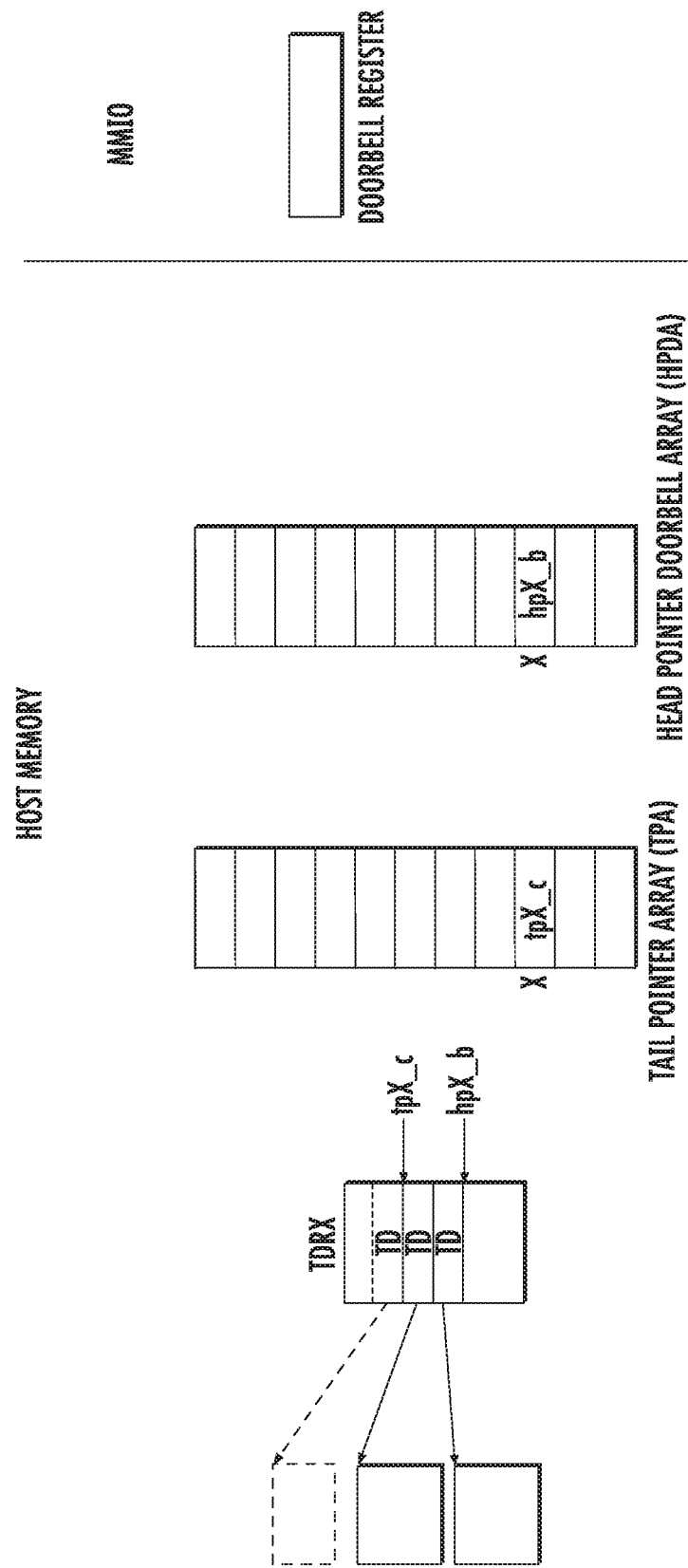
Figure 11A:
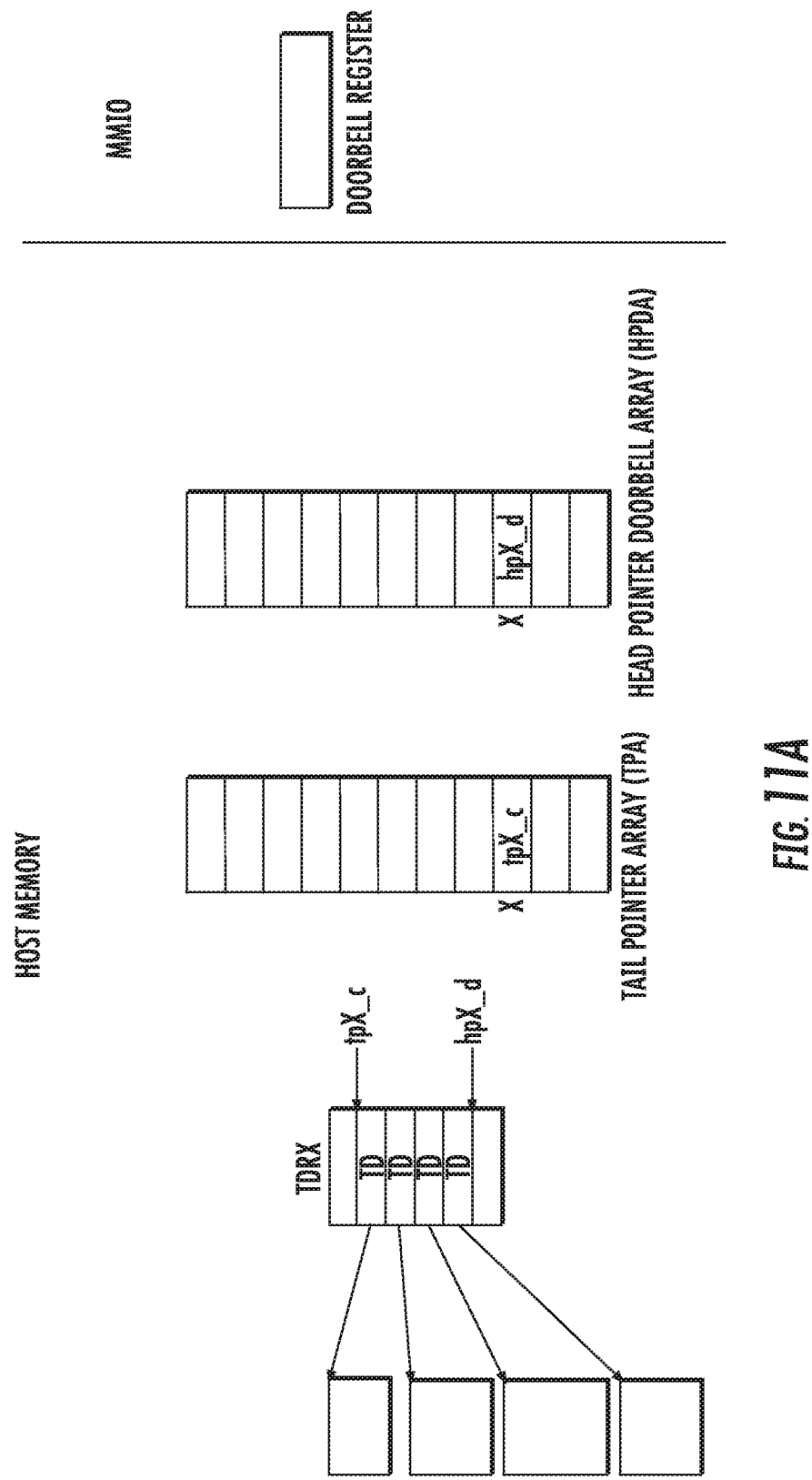

FIGS. 9-11 illustrate exemplary TDR (TDRX) transactions which support a "pipe" (pipeX, where X is the pipe number). As shown in FIG. 9, the TDR can contain multiple TDs, and the TDR state is described by the values of head pointer and tail pointer. The head pointer (hpX_b) points to the next empty slot in TDRX, and the tail pointer (tpX_a) points to the current location in TDRX (i.e., the location the peripheral will process next). As previously noted, when the head pointer equals the tail pointer, the ring is empty. Any TD between the tail pointer and head pointer is controlled by the peripheral processor; while the following scheme is based on a mutually exclusive control (i.e., when the host controls a memory, the peripheral cannot write to the memory and vice versa), those of ordinary skill in the related arts, given the contents of the present disclosure, will readily appreciate that other forms of shared access may be substituted with equal success. As previously noted, the head and tail pointers can be exchanged between host and peripheral processors via the TPA and HPDA data structures of the MMIO.

FIG. 10 depicts the exemplary TDR after the peripheral processor has completed processing a TD. Specifically, as shown, once the peripheral processor has completed a TD, it updates the TD and the TPA with the address of the next TD to be processed, followed by a generation of an MSI. Responsive to the MSI, the host processor frees the TD and indicates successful completion to the client service.

FIG. 11 depicts the exemplary TDR queuing additional TDs for subsequent processing. As shown, when the host processor queues a new buffer, it checks whether there is an entry available in the TDR. Where there is an entry, the host processor populates the TD at the address pointed to by the head pointer, and then the head pointer value is updated. Thereafter the host processor updates the HPDA with the new head pointer value, which notifies the peripheral processor of the change.

FIGS. 9A-11A illustrate exemplary TDR (TDRX) transactions in the context of the architecture of FIG. 7A (i.e., doorbell register in MMIO) discussed above.

Figure 12:
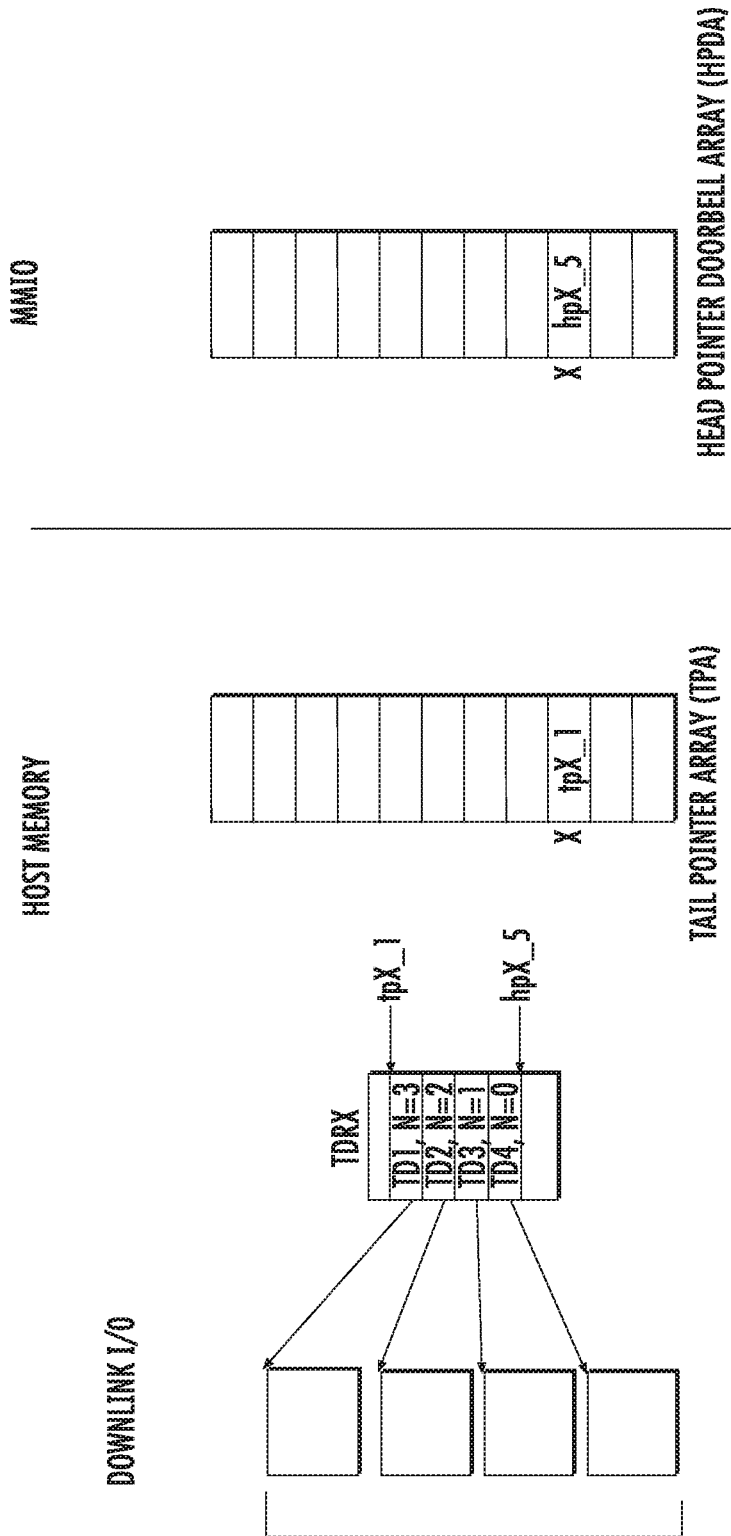
FIGS. 12-13 are logical representations of one exemplary transfer descriptor ring (TD) illustrating over-buffering and termination prior to completion, in accordance with the principles described herein.
Figure 13:
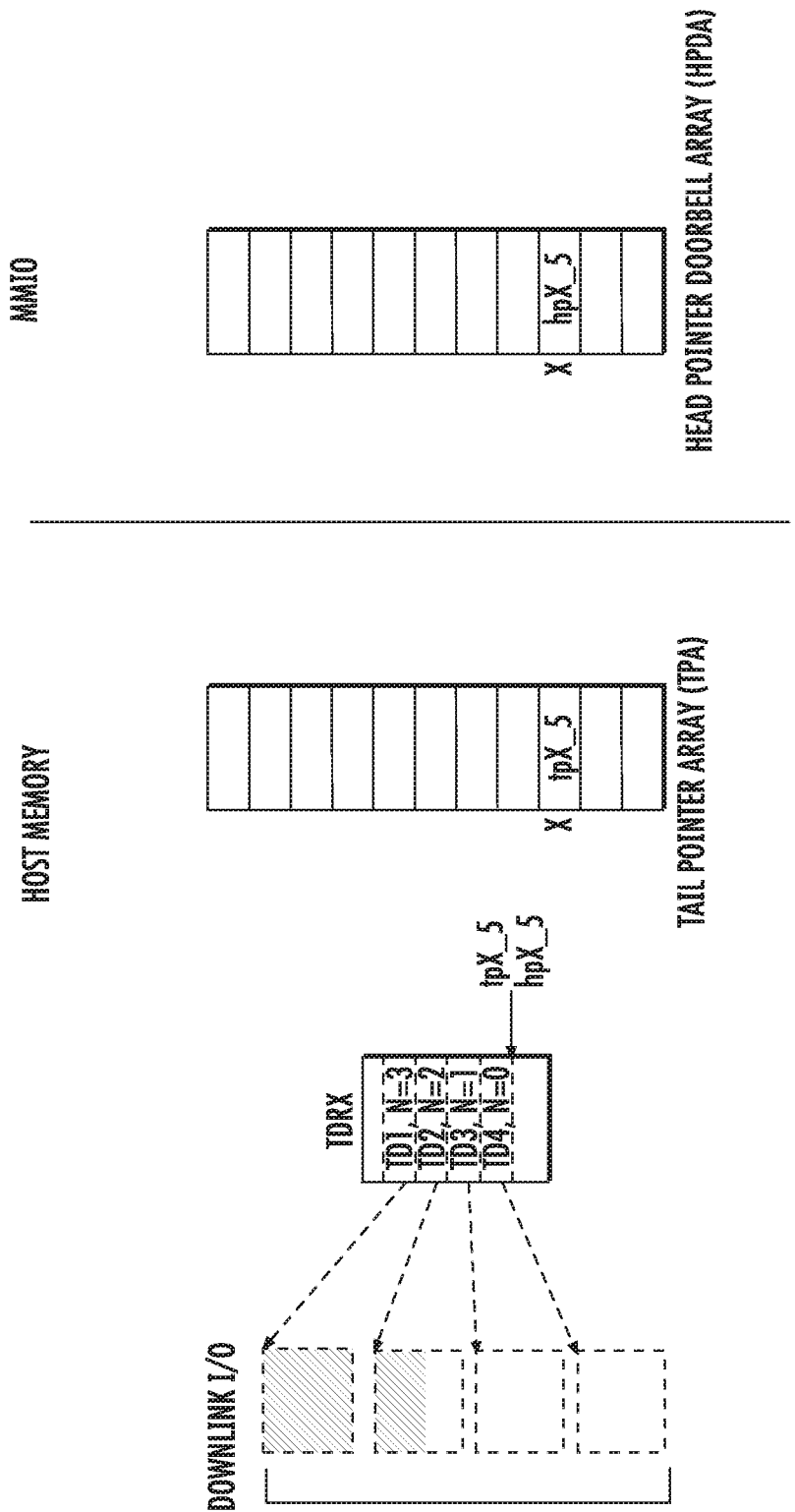

Referring now to FIGS. 12 and 13, there may be special considerations for downlink transfers.

As previously noted, in the exemplary embodiment, when a host processor queues a TD for a downlink transfer in a TDR, the size field indicates the expected size of the buffer queued. On completion, the peripheral processor overwrites this value with the actual number of bytes written in the buffer. In some cases, the host processor may not know in advance the amount of data which will be sent by the peripheral processor. In some designs, the host processor may queue a large buffer out of an abundance of caution (e.g., to prevent a buffer overrun). For such implementations, the host processor may additionally queue a number of such large buffers in memory. See FIG. 12.

In some cases, the I/O transfer may be terminated prior to completion (presumably consuming fewer of the TDs than were queued for the transfer). In these scenarios, the peripheral processor generates the end transfer completion for the TD irrespective of the Next count (ignoring the remaining buffers). In such cases, the host processor will reap all of the TDs from the TDR (including the extraneous TDs). See FIG. 13.

In the foregoing embodiments, the TDR is valid while the pipe is open. Pipes can be opened or closed based on appropriate messaging. For example, in one such implementation, an Open Message provides the address of the TDR and its size, whereas a Close Message completion may "reap" the TDR (e.g., enabling the data to be overwritten or allocated to other purposes, etc.). When a pipe is not open, its corresponding values within the TPA and HPDA are not relevant (or otherwise disregarded).

In one aspect, the host processor controls the state of the pipe via a messaging data structure. In one exemplary embodiment, the messaging data structure is queued according to a message ring (MR), which operates in a manner similar to the aforementioned TDR. Specifically, the MR is described by a message tail pointer (MTP), a message head pointer (MHP), and a message head pointer doorbell (MHPD). When initializing the IPC state machine, the processor configures the MR, and sets the MR base address in the MTP, and update context information which is configured to cause the peripheral processor to read the MR base address in the MHPD and transition the Run Time IPC State Machine of FIG. 6 to the Running State 606. Thereafter, the host can transact messages with the peripheral processor.

During run time operation, every time the host has a new message to send, it checks whether there is space in the MR for a message request. If so, a new message entry is created at the MHP and the head pointer value is updated. The new head pointer value is written to the MHPD. When the peripheral processor has consumed the message, it updates the status of the message and then updates the MTP. Additionally, the peripheral processor sends an MSI.

Various other modifications and/or permutations of the TD, TDR, and MR data structures and transactions may be made by one of ordinary skill, given the contents of the present disclosure.

Exemplary Power Management Scheme—

As a brief aside, existing PCIe implementations support a so-called "standby" or "sleep" mode. However, existing PCIe sleep mode operation was designed for personal computer implementations which have sleep states that are less involved than techniques used in e.g., typical cellular phone devices, etc. Accordingly, existing PCIe specifications mandate an exit latency that is much shorter than the actual exit latency that most cellular devices can support (an unresponsive peripheral processor would cause the host fabric to hang). In view of the limitations of existing PCIe implementations, the disclosed IPC enabled host and peripheral processors independently track sleep mode operation so that the shared memory interface (MMIO) can be "gated off" during sleep mode operation until the sleeping processor wakes up.

In one embodiment, the computer readable instructions, when executed by at least one of the first or second processors (102A, 102B) is configured to perform power management. In one exemplary embodiment, power management between the two independent processors is configured according to a sleep message. One such sleep message contains: a target field that indicates which processor (e.g., host or peripheral) the message is directed to, a state field that triggers the appropriate processor state machine to enter or exit a sleep mode, a type field which identifies the message type, and a completion status field which indicates whether the sleep message is succeeded or failed.

In one exemplary embodiment, two (2) registers control the peripheral processor sleep state machine: Peripheral Sleep Notification (in the host memory) and Peripheral Sleep Control (in the peripheral processor memory). Peripheral Sleep Notification is written by the peripheral processor to indicate whether the device is active or sleeping. The peripheral processor notifies the host processor (via e.g., an MSI) after updating this register. Peripheral Sleep Control sits in the peripheral processor MMIO space and is updated by the host to indicate active mode, sleep mode, and wake mode. An interrupt is triggered when the host updates the Peripheral Sleep Control register.

In one exemplary embodiment, the peripheral initiates entry to sleep mode autonomously (without host assistance). In other embodiments, the peripheral may be gated by the host processor, or be otherwise conditionally limited as to initiating sleep mode operation. In one such case, the peripheral processor triggers sleep mode operation when: there is a very high probability that it will enter sleep, the sleep state machine is in the active mode, and the host has not asserted device wake. The peripheral processor may trigger wake operation when: the sleep state machine is in sleep mode, and the peripheral processor device requires the communications link for communication, or the host requires the peripheral processor to wake-up (indicated via a device wake assertion).

Figure 14:
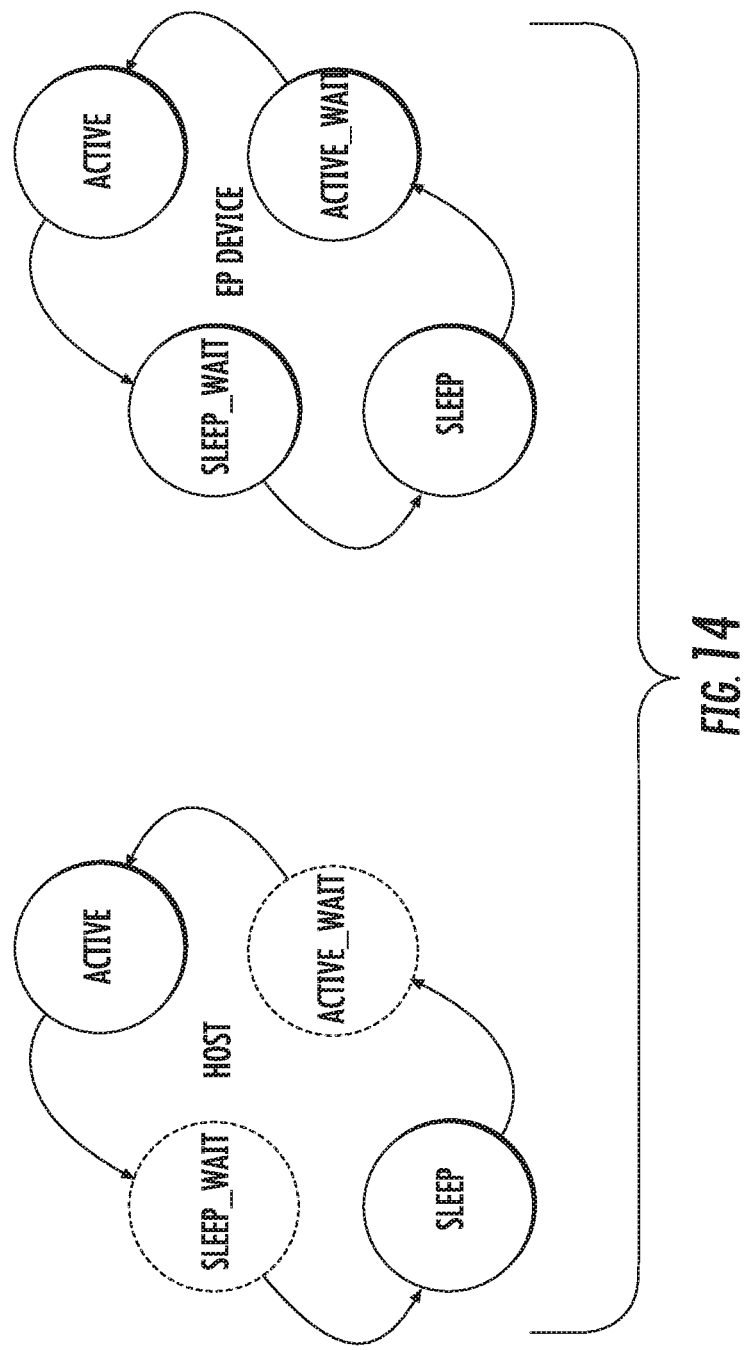
FIG. 14 is a logical block diagram of exemplary independent state machines within each processor which support a peripheral processor initiated sleep mode, useful in conjunction with the various described embodiments.

FIG. 14 illustrates the independent state machines within each processor which support a peripheral processor initiated sleep. In some embodiments, wake-up procedures can be initiated by using an out-of-band GPIO (which triggers wake) in other embodiments, wake-up procedures can be triggered via a dedicated in-band MMIO doorbell.

In order to go to sleep, the peripheral processor can send a sleep mode request in the Active State via the Peripheral Sleep Notification register, and enter the Sleep_Wait State. When in Sleep_Wait State, the peripheral processor is quiescent and does not initiate or complete any data transfers or messages. The peripheral processor monitors the Peripheral Sleep Control register for host action.

When the host detects the sleep mode request, the host processor updates the Peripheral Sleep Control register to Sleep Mode and enters the Sleep State. The peripheral processor detects the update in the Peripheral Sleep Control register and enters the Sleep State.

In the Sleep State, the peripheral processor checks whether the host processor has any pending transfers or messages in flight. If so, then the peripheral processor initiates the "wake-up" process to transition to the Active State. Similarly, if the peripheral processor needs to access the communication link, then it will wake-up.

In order to wake-up, the peripheral processor sends an Active Mode request via the Peripheral Sleep Notification register and enters the Active Wait State. The peripheral processor can thereafter immediately access the communications link for data transfer and messages, however (in order to prevent a state machine race condition) the peripheral processor cannot enter sleep or send a Sleep Mode request.

Responsive to the Active Mode request, the host updates the Peripheral Sleep Control register to Active Mode and enters the Active State. The peripheral processor enters the Active State when it sees the host's update in the Peripheral Sleep Control register.

The host initiated sleep process is similar. When the host is ready to enter sleep, it informs the peripheral processor via a Host Enter Sleep Message. Upon seeing the Host Enter Sleep Message, the peripheral processor suspends its own sleep state machine, and processes all pending TDs.

Responsive to the Sleep Message completion, the host may transition to sleep mode; thereafter, the peripheral processor may also independently enter sleep mode. If the peripheral processor needs to reestablish communication with host, it can request the host to wake-up via e.g., an out-of-band GPIO (which triggers wake). Once the host has woken, the host updates the peripheral with a Host Exit Sleep Message.

Referring back to the peripheral processor, once the peripheral processor TDR processing is complete, the peripheral processor transmits a complete/acknowledge response to the Sleep Message. Thereafter the peripheral processor will not accept any more TDRs until it receives a Host Exit Sleep Message from the host processor (received via a Message Ring (MR)). The peripheral will acknowledge/complete the Host Exit Sleep Message before resuming data transfers.

Exemplary Error Recovery—

In one embodiment, the computer readable instructions, when executed by at least one of the first or second processors (102A, 102B) is configured to handle and/or recover when the other processor experiences an error.

Figure 15:
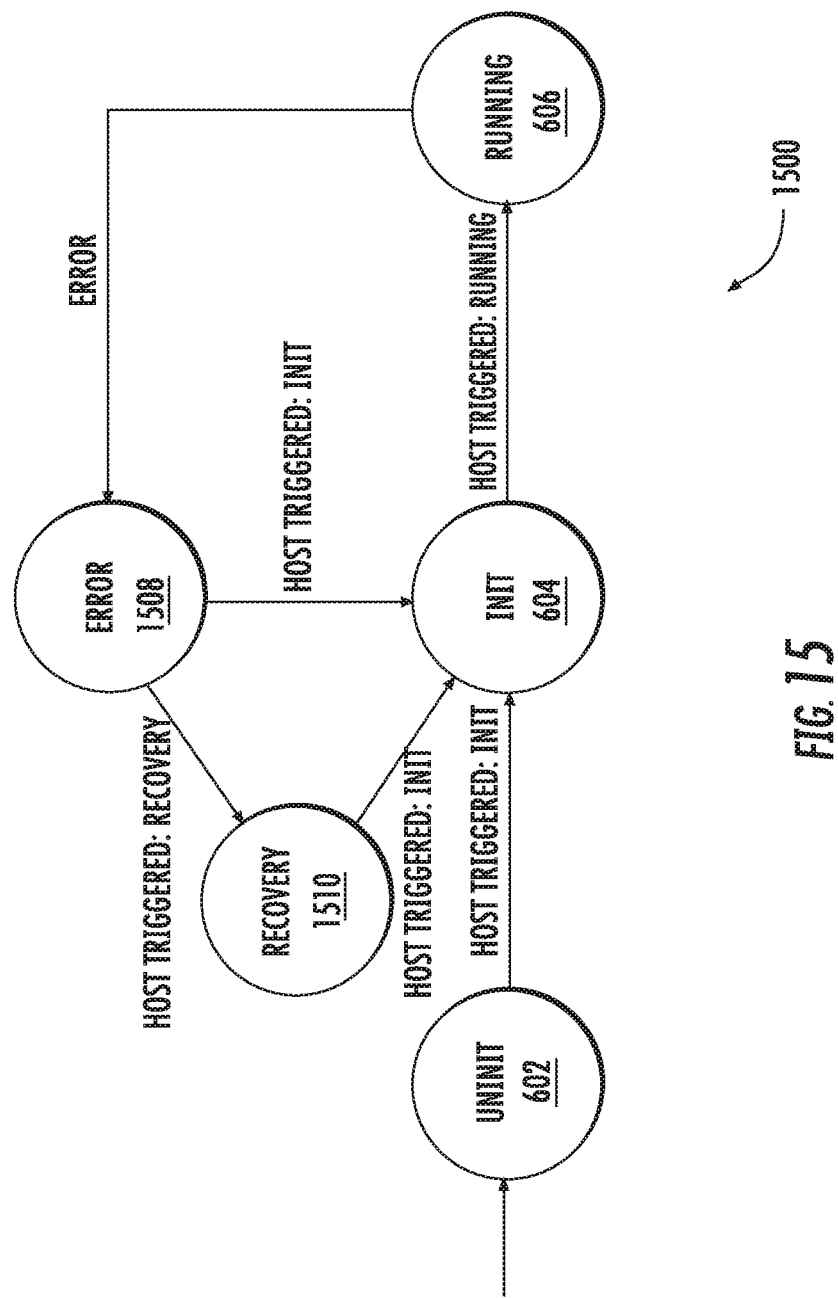
FIG. 15 is a logical block diagram of an exemplary run time operation state machine which supports error recovery, useful in conjunction with the various described embodiments.

As shown in FIG. 15, some embodiments 1500 may incorporate an Error Recovery state 1510. Specifically, for any error detected in the Run IPC Protocol (which operates similar to the features described with reference to FIG. 6), the IPC state machine moves to the Error State 1508. Thereafter, the host processor may trigger an error recovery procedure by transitioning to the Recovery State 1510. In one embodiment, the peripheral processor includes an error recovery handler which collects last known state and/or protocol information. This recovery information can be used to "rollback" the transactions to the most recent recoverable state, thereby allowing the transaction to gracefully exit (or continue). Certain types of ongoing data transfer errors can be detected via hardware/software mechanisms like DMA completion error, polling link state, etc.

In one exemplary embodiment, the host triggers transition to the Recovery State 1510 by writing Recovery to the IPC Control register. Responsively, the peripheral processor collects the reliable tail pointers for all reliable pipes (pipes which were initialized with reliability flags), and updates the Head Pointer Doorbell Array entry with these reliable tail pointer values. The remaining entries in the Head Pointer Doorbell Array are set to zero. The peripheral processor updates the IPC Status to Recovery and sends a notification MSI to the host.

When the host receives the notification, it checks the IPC Status Register to detect change to Recovery State 1510; in the Recovery State, the host executes an appropriate Recovery Protocol to recover any trapped debugging information. Thereafter, the host and the peripheral processor re-initialize the link and appropriate data structures.

Methods—

Figure 16:
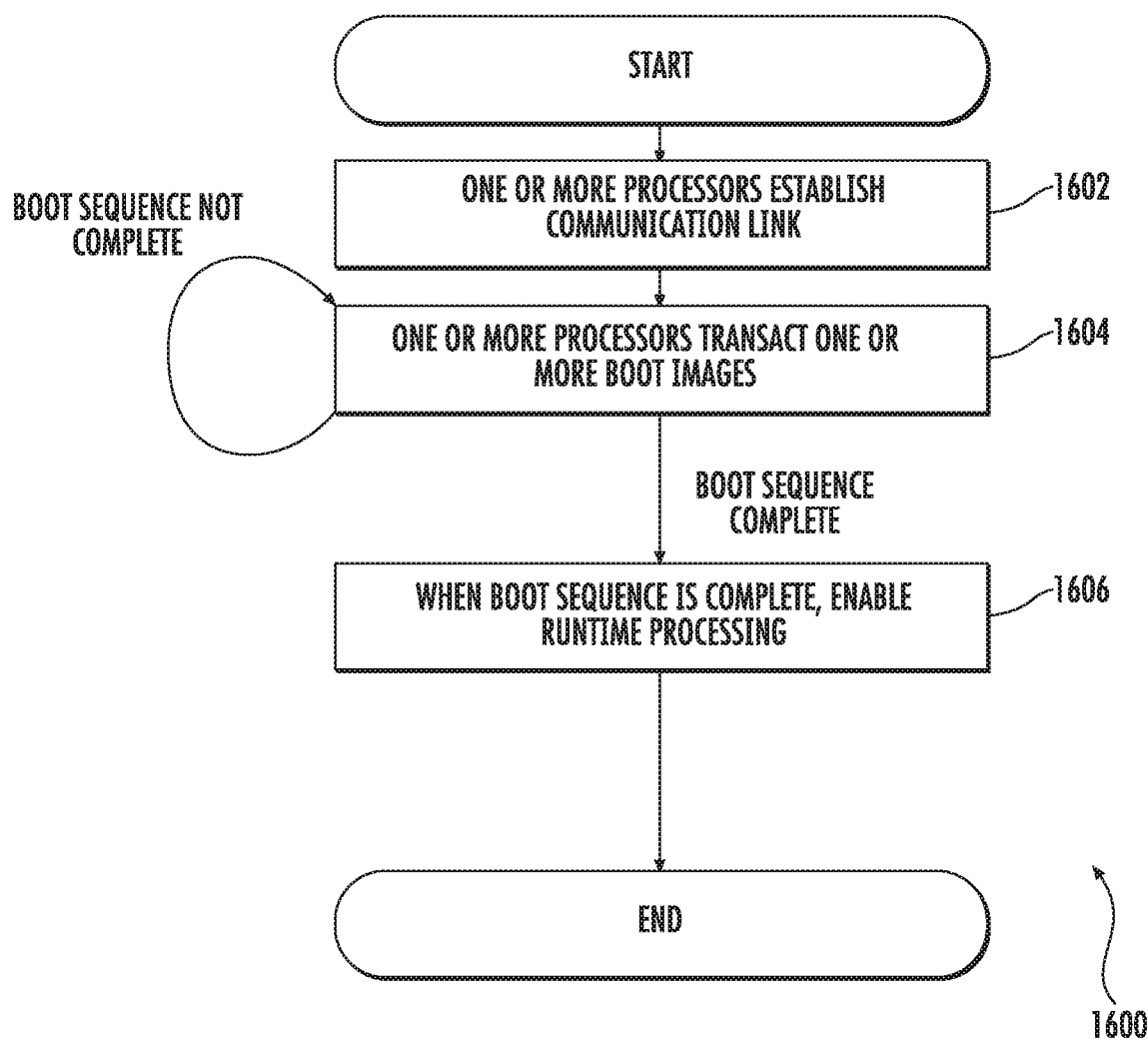
FIG. 16 is a logical flow diagram illustrating an exemplary generalized boot process for independently operable processors, in accordance with the present disclosure.
Figure 17:
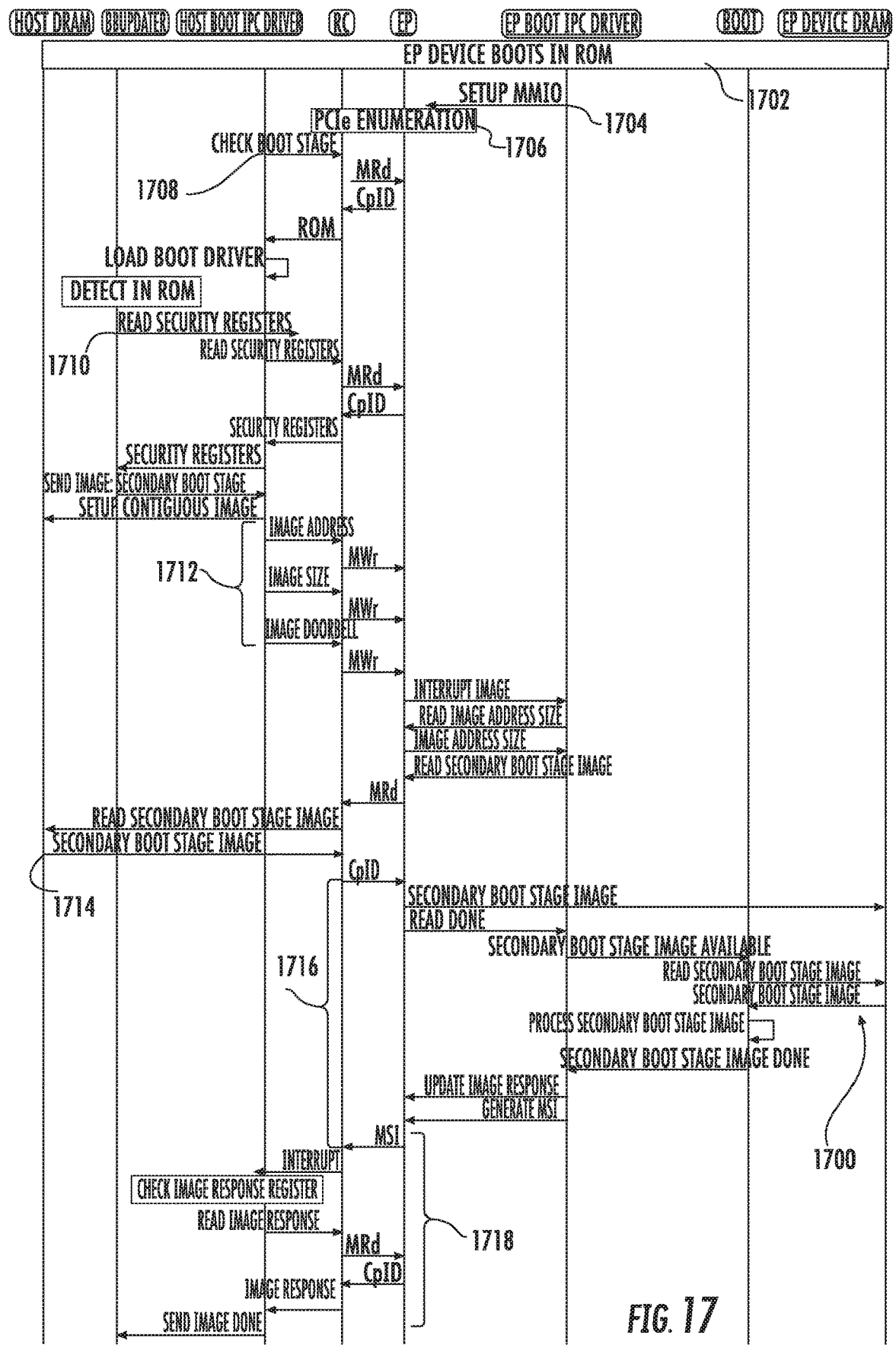
FIG. 17 is a software ladder diagram illustrating one exemplary implementation of the generalized boot process of FIG. 16, in accordance with the present disclosure.

FIG. 16 is a logical flow diagram illustrating an exemplary generalized boot process 1600 for independently operable processors, in accordance with the present disclosure. FIG. 17 illustrates one exemplary software ladder diagram 1700 illustrating the operation of an exemplary implementation of the generalized boot process of FIG. 16.

At step 1602 of the method 1600, one or more processors establish a communication link to the other processor(s). In one exemplary embodiment, the one or more processors each individually execute a local small boot ROM when first powering up (or coming out of reset, etc.). The local small boot ROM is configured to, upon successful execution, initialize and enable a memory mapped input/output (MMIO) region (see e.g., steps 1702 and 1704 of FIG. 17). In one such embodiment, the local small boot ROM stores a boot driver image (e.g., less than 50 Kilobytes (KB)) which enables the peripheral to transact and store one or more subsequent (secondary) boot images via the communications link.

While the exemplary embodiment incorporates a small boot ROM that is local to the peripheral to execute the initial boot sequence, it is appreciated that other boot schemes and/or memory structures may be substituted with equivalent success, given the contents of the present disclosure. For instance, the local boot ROM may additionally configure e.g., input/outputs (I/O) for other interfaces and/or a basic I/O system (BIOS), service interrupts, authentication and/or other verification mechanisms of program code, etc. Common examples of memory structures useful for the foregoing include without limitation, non-volatile devices such as e.g., so-called "flash" memory, EEPROM, and other types of ROM.

In some embodiments, a host processor establishes the communication link e.g., such as based on a power-up sequence or a "wake" sequence, etc. In other embodiments, the communication link may be enabled and/or disabled based on one or more out-of-band processes and/or logic. For example, in some cases, another processor may enable the communication link as part of the other processor's initialization sequence. In other examples, the communication link may be enabled and/or disabled so as to reduce power consumption during periods where data is not transacted (or only low priority data that can be postponed is transacted, etc.).

For embodiments where the processor is not in direct control of the communication link (such as where the communication link is controlled by another processor), the processor may detect when the communication link is successfully enabled based at least in part on signaling of the communication link itself (e.g., pull-up/pull-down signaling, signal toggling, interrupt signaling, etc.). In still other embodiments, the processor may be notified of successful communication link status based on one or more out-of-band signaling (e.g., an interrupt, timer, low speed interface, etc.).

In some implementations, the communication link may enumerate the one or more processors which are attached to the communications link (see e.g., step 1706 of FIG. 17). In other implementations, the communication link may have a fixed topology such that the processors are aware of one or more other processors attached to the communications link, thereby simplifying and/or obviating the enumeration process. In other implementations, the communication link may have dynamic network topology considerations which require network enumeration from "scratch" each time. For example, the communication link may support one or more other processors that are independently powering on or off at unpredictable intervals (e.g., based on power optimization and/or user activity). In other variants, the communication link may physically change through the course of operation, such as where processors (and/or associated devices) may be added to the communications link via a hot-plug/hot-swap process.

In some technologies, independently operating processors are reset (or assumed to have been reset), when the communications link is first established. In other technologies, independently operating processors may be powered on and/or powered off in a manner distinct from the communications link; accordingly in some implementations the processor must determine whether other processors connected to the communications link are operational. The operational status of the other processors may be determined based on, for instance one or more status registers, and/or the contents of one or more memory mapped memories. In still other variants, the operational status of the processors may be inferred from the action of one or more communications link state machines.

In one such variant, the processor determines the operational status of the other processor(s) by reading the current boot stage of the other processor(s) (see e.g., step 1708 of FIG. 17), and authenticating the other processor by reading security registers (see step 1710 of FIG. 17). While the exemplary embodiment authenticates the peripheral by reading one or more security registers, it is appreciated that other authentication and/or authorization schemes may be substituted with equal success, given the contents of the present disclosure. Common examples of authentication schemes include e.g., password/passcode verification, challenge response authentication, digital signature verification, etc.

Various other schemes for determining the operational status of one or more processors of the communication link are readily appreciated by those of ordinary skill when given this disclosure.

At step 1604 of the method 1600, the processor provides one or more boot images to another processor. In one exemplary embodiment, the processor selects the one or more boot images based on a current boot stage of the other processor. The processor may also be configured to select the one or more boot images to support different operations. More generally, the set of boot images provided with a generic applications processor may incorporate a variety of drivers, communication stacks, software, etc. so as to accommodate a wide variety of peripheral processor applications, of which only the relevant portion is selected for operation. In some cases, the relevant portion of applications is determined by the host processor based on e.g., user preferences, software applications, commercial configuration, etc.

In some embodiments, provisioning includes the processor configuring the other processor to read the boot image. For example, as shown at step 1712 of FIG. 17, the processor writes the boot image memory parameters to the other processor; responsively, at steps 1714 and 1716 of FIG. 17, the other processor reads the boot image from the processor's memory (or in some cases, performs a direct memory access (DMA)). Common examples of image parameters include, without limitation, the image address and/or image size.

In other embodiments, the processor writes the boot image to the other processor's memory mapped space. In one such variant, the processor configures the other processor's memory so as to accommodate the boot image by providing appropriate boot image information to the other processor (so as to enable the other processor to configure its own memory space). In such cases, the processor may rely on the other processor's own internal memory management, or the other processor may partition its memory so as to accommodate the impending secondary boot image transfer.

In some embodiments, the one or more boot images may be static images which are fetched from a non-volatile memory element. Alternatively, the one or more boot images may be semi-statically or dynamically configured images which are selectively assembled from component images. For example, at step 1714 of FIG. 17, the host processor may select a cellular communications protocol stack (e.g., from a number of different supported cellular technologies) based on successful authentication of the baseband processor and/or the customer's account.

In one embodiment, the one or more boot images comprise a set of distinct boot images, each configured to be executed within a substantially sequential order. In one exemplary implementation, the set of distinct boot images include a boot loader which is configured to dynamically identify one or more additional operational boot sequences for subsequent execution, and one or more additional operational boot sequences. Those of ordinary skill in the related arts will readily appreciate that the disclosed procedures and apparatus are readily extensible to multiple layers of booting e.g., so as to support tertiary, quaternary, and even higher order boot images.

In one such variant, the additional operational boot sequences may include software images useful for e.g., execution of one or more functionalities associated with an operating system. In another such variant, the additional operational boot sequences may include software images useful for e.g., execution of one or more functionalities associated with high level applications (e.g., third party applications, user specific applications, etc.). Common examples of software which may be incorporated within the additional operational boot sequences include hardware drivers, software configurations, software applications, etc.

At step 1606 of the method 1600, when the boot sequence of the other processor has successfully completed, the other processor returns a successful response; thereafter the processors can enable runtime processing.

In order to assure that the boot image (or sequence of boot images) are intact (e.g., have not been corrupted in transfer) and have not been tampered with, the processors may additionally execute one or more steps of integrity checking and/or image verification. Common examples of integrity checking include e.g., cyclic redundancy hashes, signature verification, etc.

When the processor(s) have successfully verified that the boot image(s) have been correctly transferred, the processor(s) signals completion (see e.g., step 1718 of FIG. 17). In some embodiments, successful completion is signaled via one or more interrupt signaling and/or a message signaled interrupt (MSI or MSI vector). Servicing the interrupt includes reading an image response register which includes the status of the secondary boot image processing. Other common schemes for status checking include e.g., polling, register read/writes after timer execution, etc. Artisans of ordinary skill in the related arts will readily appreciate that regardless of how well designed software may be, inevitably certain "corner cases" or anomalies may exist which are unforeseeable. For example, there may be cases wherein, after the peripheral device indicates a successful transfer completion, the peripheral device still cannot proceed with runtime execution. Accordingly, the host must be able to reliably know when the next execution stage has begun. In one exemplary implementation of the present methodology, the host processor polls an execution stage register; in other implementations, the peripheral device explicitly indicates progress via an MSI. In even other implementations, a timer that sets a minimum or maximum bound on response times is utilized. For example, the host processor may set an upper temporal bound (e.g., 50 ms), during which the peripheral processor's execution stage must change to secondary boot stage. Lack of an execution stage register change (within the peripheral device) are treated as e.g., a fatal error by the host.

Figure 18:
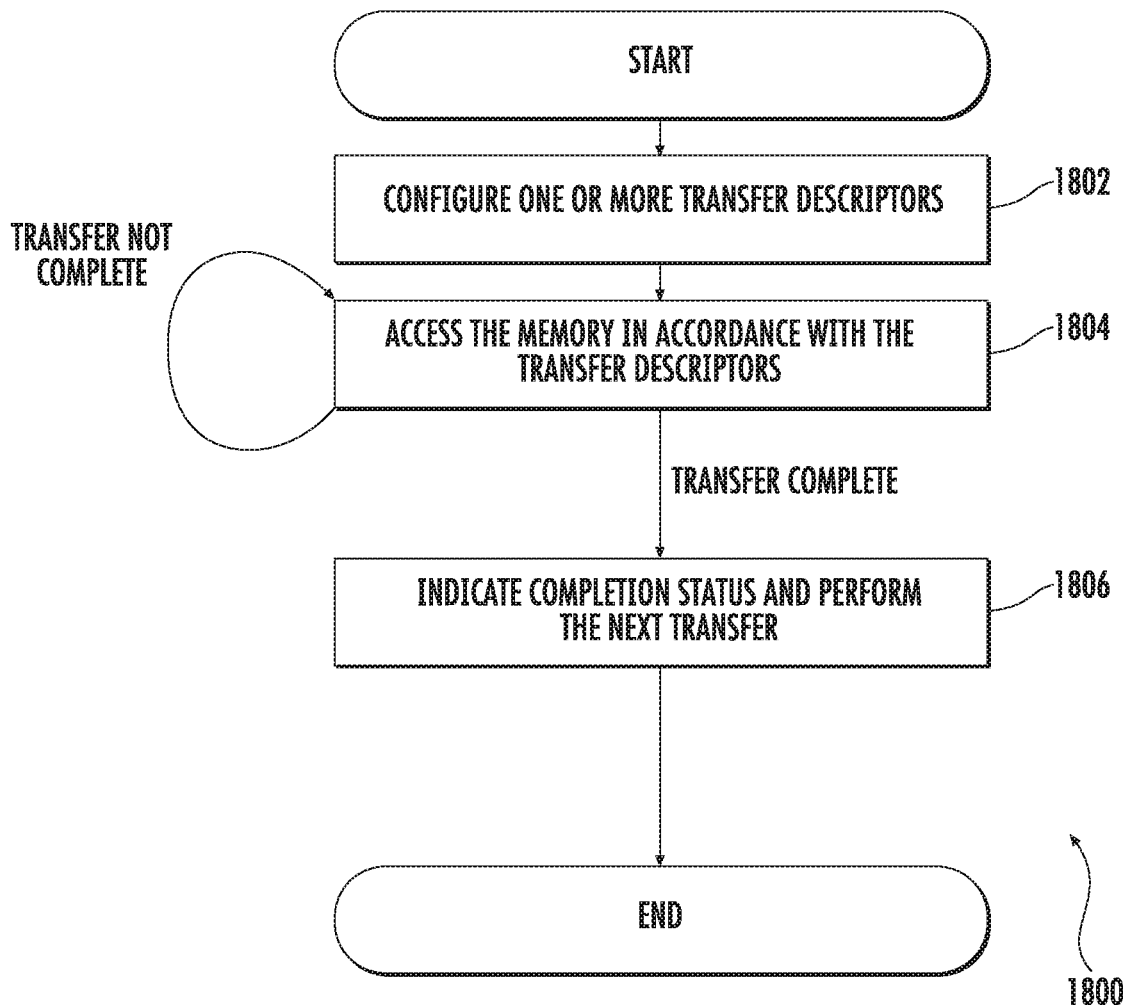
FIG. 18 is a logical flow diagram illustrating an exemplary generalized runtime transfer process for independently operable processors, in accordance with the present disclosure.

FIG. 18 illustrates a generalized runtime transfer process 1800 for independently operable processors, in accordance with one aspect of the present disclosure.

At step 1802, a first processor configures one or more transfer descriptors for another processor to consume. In various exemplary implementations of the process 1800, the accesses are represented by a ring array (e.g., transfer descriptor ring (TDR)) including one or more transfer descriptors that identify contiguous sections of memory, queued in sequential sequence. Those of ordinary skill in the related arts, given the contents of the present disclosure, will readily appreciate that other data structures may be used with equivalent success. Examples of other data structures include without limitation: arrays, multi-dimensional arrays, hash tables, linked lists, tuples, etc.

In one exemplary embodiment, a host can queue variable size transfers for the peripheral device to consume via an uplink data transfer. In some variants, the transfer descriptors include a next count that indicates a number of transfer descriptors for the I/O access, thereby enabling non-continuous buffer transfers from host memory without a copy to an intermediary buffer. More directly, an uplink transfer can automatically complete each transfer descriptor until it reaches a "next count" of 0 (i.e., no remaining I/O transfer descriptors), thereby providing a seamless uplink transfer despite being stored in the non-continuous memory buffer. Where the next count is 0, the peripheral device generates a completion for the transfer descriptor with a status that ends the transfer; in contrast, when the next count is not zero, the peripheral device does not generate a completion for the TD and processes the next queued TD.

In another embodiment, a host can configure itself to receive variable size downlink transfers from the peripheral device. Unlike uplink transfers where the host is aware of the incipient transfer size, the host is unaware of the total downlink transfer size, and thus must queue a significantly larger buffer so as to conservatively handle the downlink data. In order to ensure sufficiently high data throughput for the downlink, the host may be required to queue multiple large data buffers. Additionally, in some variants, the host configures a "size" field which indicates the length allocated to the downlink transfer (i.e., the maximum transfer size); the size field may be used by memory management processes, etc.

At step 1804, for each transfer, the processor(s) accesses the memory in accordance with the transfer descriptors. In uplink variants, the transfer descriptors may include a next count that indicates a number of transfer descriptors for the I/O access, thereby enabling non-continuous buffer transfers from host memory without a copy to an intermediary buffer. More directly, an uplink transfer can automatically complete each transfer descriptor until it reaches a "next count" of 0 (i.e., no remaining I/O transfer descriptors), thereby providing a seamless uplink transfer despite being stored in the non-continuous memory buffer. In some implementations, where the next count is 0, the peripheral device generates a completion for the transfer descriptor with a status that ends the transfer; in contrast, when the next count is not zero, the peripheral device does not generate a completion for the TD and processes the next queued TD.

In downlink variants, an I/O transfer may be non-contiguous and/or terminate before reaching the uppermost limit prescribed by the size field of the transfer descriptor. For example, an I/O transfer may have a short completion that does not require all of the transfer descriptors that were queued for it. In some such cases, the peripheral device can preemptively generate an end transfer completion for the transfer descriptor irrespective of the next count. Responsively, the host processor can then reclaim the unused allocations by reaping all the remaining transfer descriptors (i.e., the last transfer descriptor will have a next count of 0).

At step 1806, upon completion of the transfer descriptors, the processor(s) indicate completion status and perform the next transfer.

In some implementations, uplink data transfers may support an optimized completion (OC) or similar feature. OC functionality enables the peripheral device to complete a partial transfer, or aggregate multiple transfer completions into a single completion. In order to aggregate transfers, the peripheral device may not generate a completion for a transfer descriptor (even upon successful transfer); rather the host must wait for a subsequent transfer descriptor to complete. This allows the peripheral device to explicitly aggregate multiple transfer completions (such as by explicitly signaling when the aggregated transfer is concluded). In contrast, in order to partially complete a transfer descriptor, the peripheral device may generate a completion for a transfer descriptor (despite not having completed the I/O access); the transfer status is additionally flagged with a partial transfer status. This allows the host processor to accept a partial transfer completion, and resume the partial transfer at a later point.

As previously noted, in downlink embodiments, the host queues a transfer descriptor for a downlink transfer in a transfer descriptor ring that includes a size field that indicates the size of the buffer queued. On completion, the peripheral device can overwrite the size value with the actual number of bytes written in the buffer. In this manner, the host processor can reclaim the remaining memory via e.g., garbage collection processes, etc. Additionally, artisans of ordinary skill in the related arts will readily appreciate that since the host processor was unaware of the total downlink transfer, the peripheral device may be required to flag error conditions such as buffer overrun, etc.

Figure 19:
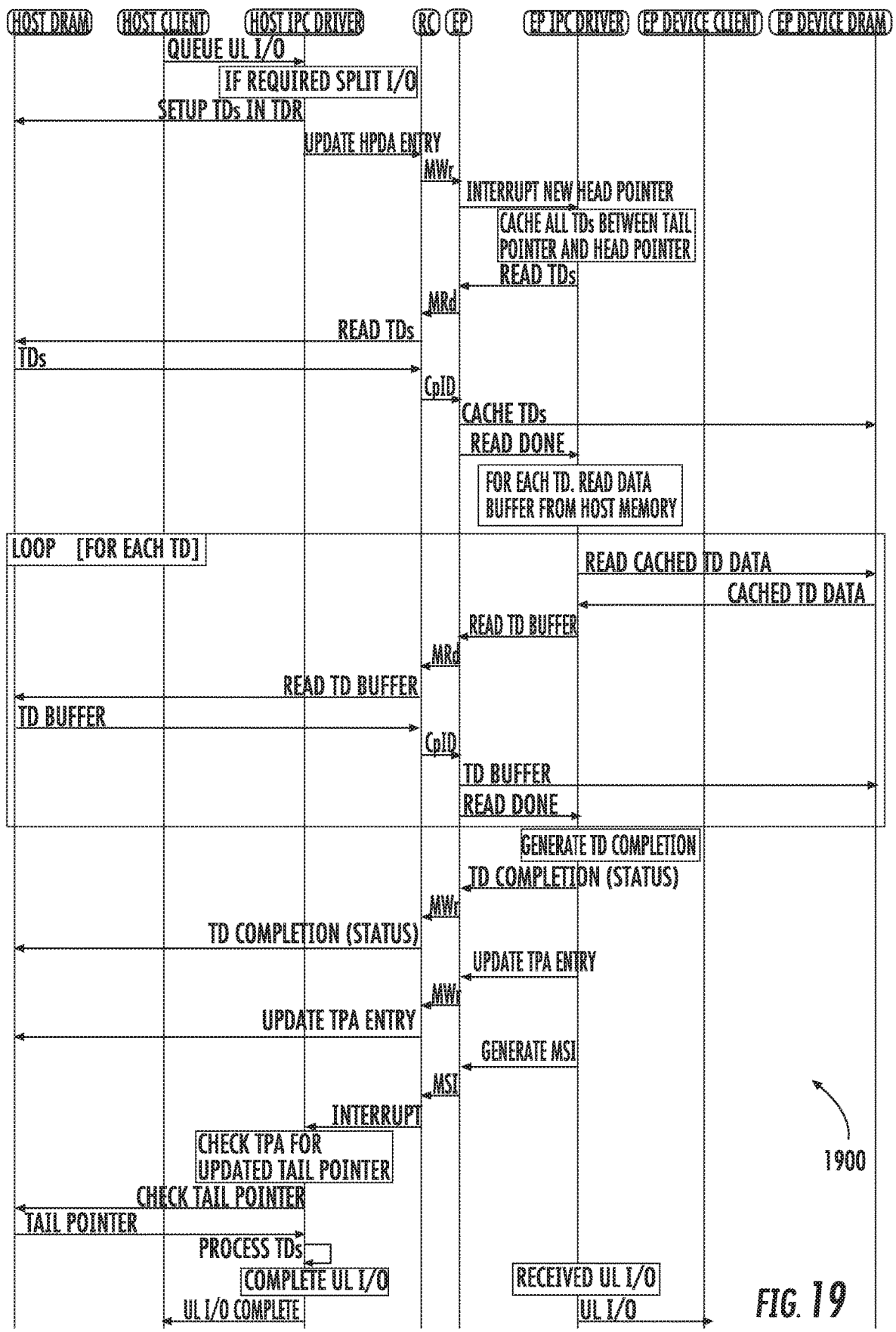
FIG. 19 is a software ladder diagram illustrating one exemplary embodiment of an uplink data transfer, in accordance with the present disclosure.
Figure 20:
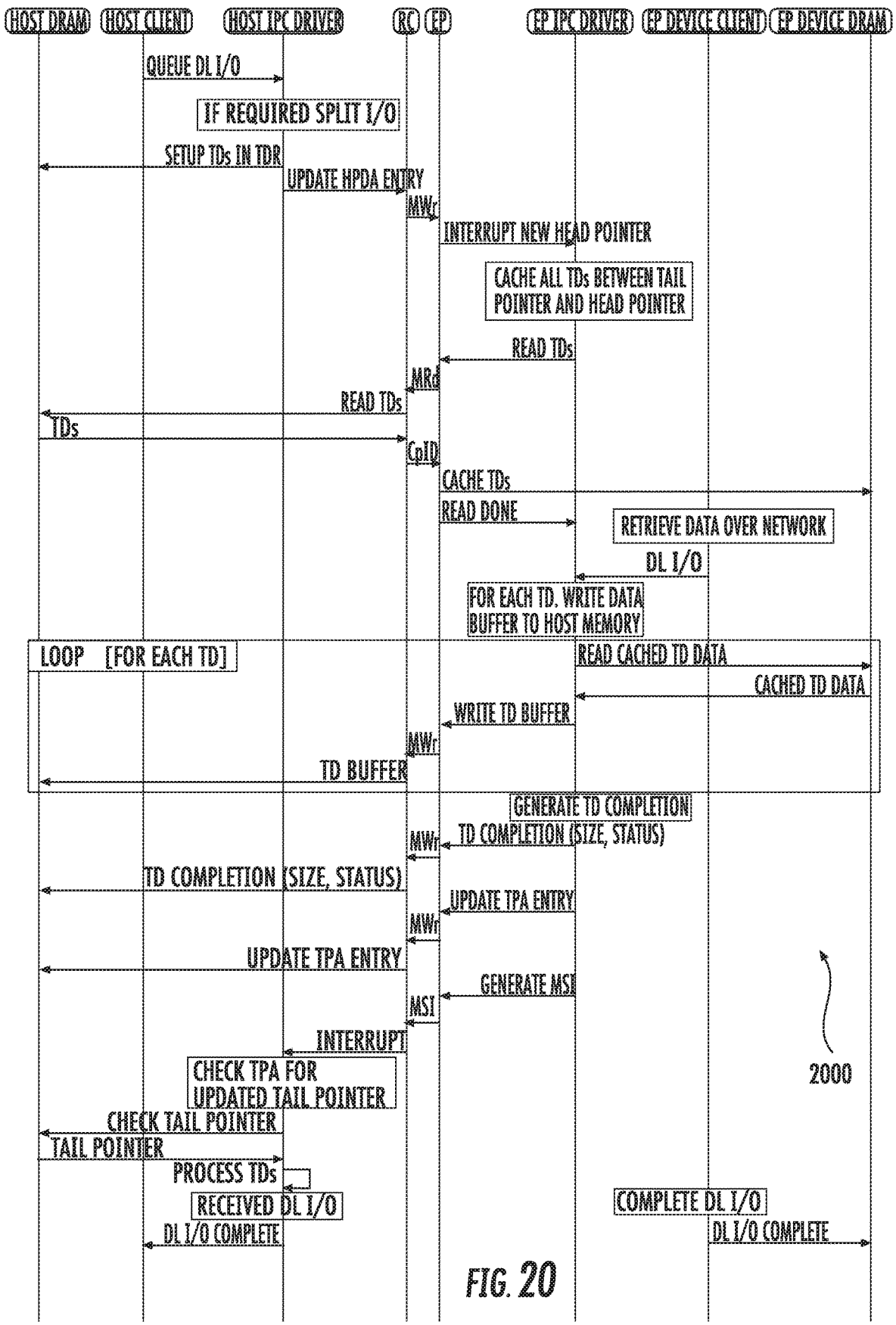
FIG. 20 is a software ladder diagram illustrating one exemplary embodiment of a downlink data transfer, in accordance with the present disclosure.

FIGS. 19 and 20 are software ladder diagrams 1900, 2000, respectively, each illustrating specific exemplary implementations of uplink and downlink transfers in accordance with the runtime transfer process 1800 described above.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method of executing a boot process in a computerized apparatus comprising a first independently operable processor apparatus and a second independently operable processor apparatus, the method comprising:

based on a determination that the second independently operable processor apparatus is performing a primary boot sequence from a storage location associated with the second independently operable processor apparatus, selecting one or more secondary boot stage images corresponding to one or more operations being performed as part of the primary boot sequence, the one or more secondary boot stage images being configured to dynamically identify one or more additional secondary boot stage images; and transmitting the selected one or more secondary boot stage images and the identified one or more additional secondary boot stage images to the second independently operable processor apparatus, enabling the second independently operable processor apparatus to execute the one or more secondary boot stage images and the one or more additional secondary boot stage images in substantially sequential order.

2. The method of claim 1, wherein the transmitting of the selected one or more secondary boot stage images comprises:

mapping the one or more secondary boot stage images to a shared memory interface; and writing, via the shared memory interface, information indicative of the one or more secondary boot stage images, thereby enabling the second independently operable processor apparatus to retrieve the one or more secondary boot stage images from a storage location.

3. The method of claim 2, wherein the retrieval of the one or more secondary boot stage images from the storage location comprises a direct memory access (DMA) via the shared memory interface.

4. The method of claim 1, wherein the transmitting of the selected one or more secondary boot stage images comprises:

writing data indicative of one or more transfer data structures, each of the one or more transfer data structures being descriptive of a portion of a memory buffer that resides in a storage device associated with the first independently operable processor apparatus; and causing the second independently operable processor apparatus to retrieve the one or more secondary boot stage images from the storage device associated with the first independently operable processor apparatus.

5. The method of claim 4, wherein the data indicative of the one or more transfer data structures comprises a head pointer value configured to be written to a doorbell array.

6. The method of claim 4, wherein the retrieval of the one or more secondary boot stage images from the storage device associated with the first independently operable processor apparatus is based at least on (i) an image address or (ii) an image size.

7. The method of claim 1, further comprising, subsequent to a notification from the second independently operable processor:

verifying a completion of a boot sequence by the second independently operable processor; and placing additional data to a storage location that is accessible by the second independently operable processor.

8. The method of claim 1, wherein:

the first independently operable processor apparatus comprises an applications processor (AP) configured to function as a host device for the computerized apparatus;

the second independently operable processor apparatus comprises a baseband (BB) processor, the BB processor being associated with a wireless modem; and the transmitting of the selected one or more secondary boot stage images to the second independently operable processor apparatus comprises transmitting the selected one or more secondary boot stage images by the AP to the BB.

9. An independently operable processor apparatus configured to:

read data written to a shared memory interface that is accessible by the independently operable processor apparatus and another independently operable processor apparatus;

based at least on the read data written to the shared memory interface, retrieve a plurality of secondary boot stage images from the another independently operable processor apparatus; and execute at least a first portion of the retrieved plurality of secondary boot stage images subsequent to execution of an initial boot stage, and execute at least a second portion of the retrieved plurality of secondary boot stage images, at least the second portion being selectively assembled from the plurality of secondary boot stage images.

10. The independently operable processor apparatus of claim 9, further configured to:

validate the retrieved plurality of secondary boot stage images; and based on successful validation, transmit a notification to the another independently operable processor apparatus.

11. The independently operable processor apparatus of claim 9, further configured to:

execute a tertiary boot stage subsequent to the execution of the at least second portion.

12. The independently operable processor apparatus of claim 9, wherein at least some of the retrieved plurality of secondary boot stage images is sized so as to not exceed a prescribed size selected based on one or more requirements associated with a link configured to enable data communication between the independently operable processor apparatus and the another independently operable processor apparatus.

13. The independently operable processor apparatus of claim 9, further configured to:

trigger an error condition responsive to a failure to retrieve at least a portion of the plurality of secondary boot stage images; and enable the another independently operable processor apparatus to perform an error recovery procedure, the error recovery procedure comprising at least one of (i) a reset of the independently operable processor apparatus or (ii) termination of at least the retrieval of the plurality of secondary boot stage images.

14. The independently operable processor apparatus of claim 9, wherein the retrieval of the plurality of secondary boot stage images from the another independently operable processor apparatus comprises an access of the plurality of secondary boot stage images from a storage location associated with the another independently operable processor apparatus, the access being based at least on a read of one or more transfer data structures that are each descriptive of a location of at least a respective portion of the plurality of secondary boot stage images.

15. Integrated circuit (IC) apparatus comprising:

a first digital processor apparatus configured for coupling to a first storage apparatus;

inter-processor communication (IPC) interface apparatus configured to enable data communication between the first digital processor apparatus and a second digital processor apparatus via an IPC link protocol; and logic configured to utilize a shared memory structure;

wherein the first digital processor apparatus is configured to:

select one or more boot images, the selection being dependent at least on a current boot stage of the second digital processor apparatus; and write one or more parameters and one or more transfer descriptors to the shared memory structure, the one or more parameters and the one or more transfer descriptors being associated with the selected one or more boot images and configured to be utilized by the second digital processor apparatus in reading the one or more boot images from the first storage apparatus;

based at least on (i) the written one or more parameters and (ii) information contained in the one or more transfer descriptors, enable access of the read one or more boot images by the second digital processor apparatus.

16. The integrated circuit (IC) apparatus of claim 15, wherein the read of the one or more boot images comprises a direct memory access (DMA) of the shared memory structure via the IPC link.

17. The integrated circuit (IC) apparatus of claim 15, wherein:
the first digital processor apparatus comprises a host-side applications processor (AP); and
the second digital processor apparatus comprises a peripheral-side processor configured to perform wireless communication.

18. The integrated circuit (IC) apparatus of claim 15, wherein:
the first digital processor apparatus is further configured to:
free the written one or more transfer descriptors subsequent to a detection of data indicative of a completion by the second digital processor apparatus.

19. The integrated circuit (IC) apparatus of claim 15, wherein the one or more boot images are configured to be executed by the second digital processor apparatus subsequent to a then-current boot stage thereof.

20. The integrated circuit (IC) apparatus of claim 15, wherein the second digital processor apparatus is further configured to read the one or more boot images from the first storage apparatus responsive to a doorbell placed by the first digital processor apparatus to the shared memory structure, the doorbell being configured to signal to the second digital processor apparatus an availability of the one or more boot images.

21. The integrated circuit (IC) apparatus of claim 15, wherein the one or more image parameters comprise one or more of an image address or an image size.

* * * * *